(12) United States Patent
Zheng et al.

(10) Patent No.: US 12,522,599 B2
(45) Date of Patent: Jan. 13, 2026

(54) CRYSTAL FORMS OF ACRYLIC ACID DERIVATIVES, PREPARATION METHOD THEREFOR AND USE THEREOF

(71) Applicant: ZHEJIANG HISUN PHARMACEUTICAL CO., LTD., Zhejiang (CN)

(72) Inventors: Jianfeng Zheng, Zhejiang (CN); Liang Zhang, Zhejiang (CN); Min Zhao, Zhejiang (CN); Zhenjuan Shi, Zhejiang (CN); Xufei Li, Zhejiang (CN); Zhiqing Yang, Zhejiang (CN)

(73) Assignee: ZHEJIANG HISUN PHARMACEUTICAL CO., LTD., Zhejiang (CN)

( * ) Notice: Subject to any disclaimer, the term of this patent is extended or adjusted under 35 U.S.C. 154(b) by 1046 days.

(21) Appl. No.: 17/610,167

(22) PCT Filed: May 21, 2020

(86) PCT No.: PCT/CN2020/091454
§ 371 (c)(1),
(2) Date: Nov. 10, 2021

(87) PCT Pub. No.: WO2020/238733
PCT Pub. Date: Dec. 3, 2020

(65) Prior Publication Data
US 2022/0220107 A1    Jul. 14, 2022

(30) Foreign Application Priority Data
May 24, 2019  (CN) .......................... 201910438024.8

(51) Int. Cl.
*C07D 471/04* (2006.01)

(52) U.S. Cl.
CPC ........ *C07D 471/04* (2013.01); *C07B 2200/13* (2013.01)

(58) Field of Classification Search
CPC ............... C07D 471/04; C07B 2200/13; A61P 35/00; A61K 31/437
See application file for complete search history.

(56) References Cited

U.S. PATENT DOCUMENTS

| 2018/0291019 A1 | 10/2018 | Guan et al. |
| 2019/0142811 A1 | 5/2019 | Huang et al. |
| 2020/0040001 A1 | 2/2020 | Dai et al. |

FOREIGN PATENT DOCUMENTS

| CN | 109311870 A | 2/2019 | |
| CN | 109362222 A | 2/2019 | |
| EP | 3378861 A1 | 9/2018 | |
| JP | 2003519698 A | 6/2003 | |
| JP | 2018535216 A | 11/2018 | |
| WO | 0151919 A2 | 7/2001 | |
| WO | WO-2011156518 A2 * | 12/2011 | ........... A61K 31/352 |
| WO | 2012037410 A2 | 3/2012 | |
| WO | 2015082990 A1 | 6/2015 | |
| WO | WO-2017080338 A1 * | 5/2017 | ........... A61K 31/437 |
| WO | 2021091819 A1 | 5/2021 | |

OTHER PUBLICATIONS

Burns, Arch Toxicol, 2012, 86:1491-1504 (Year: 2012).*
Deroo, J. Clin. Invest. 2006; 116(3):561-570 (Year: 2006).*
Search Report dated Jan. 5, 2023 for European patent application No. 20812533.6.
Mino R Caira Ed—Montchamp Jean-Luc: "Crystalline Polymorphism of Organic Compounds", Topics in Current Chemistry; [Topics in Current Chemistry], Springer, Berlin, DE,vol. 198, Jan. 1, 1998 (Jan. 1, 1998), pp. 163-208, XP008166276, ISSN: 0340-1022.
Stephen Byrn et al: "Pharmaceutical Solids: A Strategic Approach to Regulatory Considerations", Pharmaceutical Research, vol. 12, No. 7, Jul. 1, 1995 (Jul. 1, 1995), pp. 945-954, XP055531015.
Harwood L M et al: "Experimental organic chemistry—Principles and practice", Jan. 1, 1989 (Jan. 1, 1989), Experimental Chemistry—Organic Chemistry and Reaction,, pp. 127-132, XP003025361, ISBN: 978-0-632-02016-4.
Yu L: "Amorphous Pharmaceutical Solids: Preparation, Characterization and Stabilization", Advanced Drug Delivery Reviews, Elsevier, Amsterdam, NL, vol. 48, No. 1, May 16, 2001 (May 16, 2001), pp. 27-42, XP009065056, ISSN: 0169-409X.
International Search Report for PCT/CN2020/091454 mailed Aug. 12, 2020, ISA/CN.
Shunqiang Li, et al., Endocrine-Therapy-Resistant ESR1 Variants Revealed by Genomic Characterization of Breast-Cancer-Derived Xenografts, Cell Reports, Sep. 26, 2013, 4, 1116-1130.
Weiyi Toy, et al., ESR1 ligand-binding domain mutations in hormone-resistant breast cancer, Nature Genetic, Nov. 3, 2013, 45:1439-1445.

* cited by examiner

*Primary Examiner* — Jeffrey H Murray
*Assistant Examiner* — Luisalberto Gonzalez
(74) *Attorney, Agent, or Firm* — Yue (Robert) Xu; Apex Attorneys at Law, LLP

(57) ABSTRACT

Crystal forms A, B, C, D, E, F, G and H of a compound represented by formula I and a preparation method therefor, as well as medical uses for the various crystal forms and advantages thereof in various aspects.

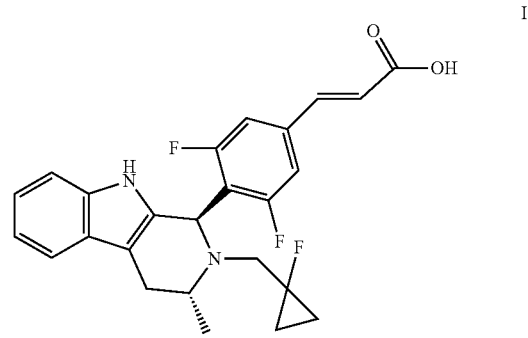

18 Claims, 10 Drawing Sheets

CRYSTAL FORMS OF ACRYLIC ACID DERIVATIVES, PREPARATION METHOD THEREFOR AND USE THEREOF

This present application is the national phase of International Application No. PCT/CN2020/091454, titled "CRYSTAL FORMS OF ACRYLIC ACID DERIVATIVES, PREPARATION METHOD THEREFOR AND USE THEREOF", which claims the priority of Chinese Patent Application No. 201910438024.8, filed with the China National Intellectual Property Administration on May 24, 2019, titled with "CRYSTAL FORMS OF ACRYLIC ACID DERIVATIVES, PREPARATION METHOD THEREFOR AND USE THEREOF", the entire disclosures thereof are incorporated herein by reference.

FIELD

The present disclosure relates to the field of chemical pharmaceutical, and specifically relates to new crystal forms A, B, C, D, E, F, G, and H of an acrylic derivative (E)-3-(3,5-difluoro-4-((1R,3R)-2-((1-fluorocyclopropyl)methyl)-3-methyl-2,3,4,9-tetrahydro-1H-pyrido[3,4-b]indol-1-yl)phenyl)acrylic acid, and preparation methods therefor; in addition, the present disclosure also relates to a pharmaceutical composition comprising the above-mentioned new crystal form and medical use thereof.

BACKGROUND

Estrogen receptors (ERs) are ligand-activated transcriptional regulatory proteins, which mediate the induction of a variety of biological effects through the interaction with endogenous estrogens. Endogenous estrogens include 17β-estradiol and estrone. ERs have been found to have two subtypes: estrogen receptor α (ERα, ESR1, and NR3A) and estrogen receptor β (ERβ, ESR2, and NR3b). Estrogen receptor α and estrogen receptor β are members of steroid hormone receptors, which are members of nuclear receptor family. Similar to the structure of nuclear receptors, ERα is composed of 6 functional domains (named A-F). ERα is a ligand-activated transcription factor, because upon its binding to a specific ligand (including endogenous estrogen 17β-estradiol (E2)), it binds to the genome sequence, that is, estrogen receptor response element and the co-regulator to form a complex in order to regulate the transcription of the targeted gene. The ERα gene is located at 6q25.1 and encodes the 595A protein. According to the difference of the splicing site and the transcription initiation site, different subtypes are obtained. In addition to the DNA binding domain (domain C) and ligand binding domain (domain E), the receptor also contains an N-terminal (domain A/B), a hinge region (D, which connects domains C and E), and a C-terminal (domain F). Domains C and E of ERα and ERβ have identity, while domains A/B, D and F have lower identity. Both receptors are related to the regulation and growth of the female reproductive tract, and also play an important role in the central nervous system, cardiovascular and cerebrovascular systems and bone metabolism. The binding of estrogen to its receptor can cause changes in a variety of cells, and its regulatory mechanism can be divided into two pathways: genomic and non-genomic pathways. ER-mediated genomic pathways include forming estrogen receptor dimers, binding to ERE in the promoter of estrogen-regulated genes, mediating the aggregation of other regulatory proteins to the promoter, and finally leading to an increase or decrease in the mRNA level of the gene. In the non-genomic pathway mediated by estrogen, estrogen can react with the estrogen binding protein that exists in or adjacent to the cell membrane of ERs, or even the cell membrane without ERs. The cellular response caused by estrogen through non-genomic pathways can increase intracellular calcium and NO levels, and activate various intracellular kinases, including MAPK, PI3K, PKA and PKC, and activate nER through phosphorylation.

About 70% of breast cancer patients express ER and/or progesterone receptors, indicating that the growth of this tumor cell is hormone-dependent, and the growth of other tumors such as ovarian cancer and endometrial cancer is also dependent on ERα. For the treatment of these diseases, ER signaling can be inhibited in various ways, including antagonizing the binding of ligand and ER, antagonizing or down-regulating ERα, and blocking the synthesis of estrogen. In addition, ERα and ERβ are also expressed in endocrine tumors such as adrenal cortex tumors, pancreatic cancer, prostate cancer and thyroid cancer, digestive tract system tumors such as colon cancer, esophageal cancer, liver cancer and pancreatic cancer, and lung cancer. Despite their certain role in patients with ER-positive tumors, the above-mentioned treatment methods can also develop drug resistance. It has been recently reported that ESR1 mutations may be one of the reasons for drug resistance in patients with metastatic ER-positive breast cancer. (Toy et al., Nat. Genetic 2013, 45:1439-1445; Li, S. et al., Cell Rep. 4, 1116-1130 (2013)). However, among the possible drug resistance mechanisms discussed, tumor growth has ER-dependent activity. Therefore, the mechanism of selective down-regulation of ERα provides a better way to block ERα activity that mediates early, metastatic, and drug-resistant cancers.

At present, a number of acrylic derivative drugs that can be used as selective estrogen receptor down-regulators (degraders) have been disclosed, including Genentech's GDC-0810 and GDC-0927, which are in clinical phase II and clinical phase I respectively; and AstraZeneca's AZD-9496, which is in clinical phase I; furthermore, a series of patent applications for acrylic derivatives have been published, including WO2011156518, WO2012037410, WO2015082990, etc. However, there is still a need to research and develop new estrogen receptor α down-regulators.

WO2017080338A1 discloses an acrylic derivative with the structure represented by the following formula I, whose molecular formula is $C_{25}H_{23}F_3N_2O_2$, and whose chemical name is: (E)-3-(3,5-difluoro-4-((1R,3R)-2-((1-fluorocyclopropyl)methyl)-3-methyl-2,3,4,9-tetrahydro-1H-pyrido[3,4-b]indol-1-yl)phenyl)acrylic acid. WO2017080338A1 also discloses the preparation method of the compound of formula I and the use thereof as an estrogen receptor antagonist or an estrogen receptor α down-regulator, indicating that the compound has a good effect of down-regulating ERα.

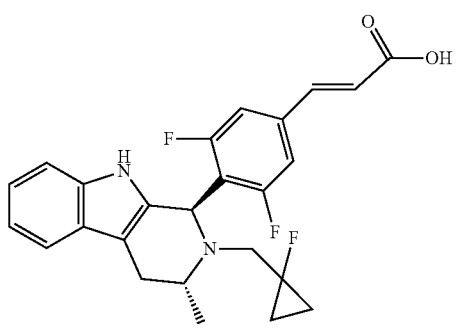

Formula I

However, the compound of formula I disclosed in WO2017080338A1 prepared by the preparation method thereof is a yellow solid in an amorphous form, and its stability and granularity are still not satisfactory. In particular, the amorphous particles disclosed in WO2017080338A1 have small granularity and poor fluidity, and are not suitable for the forming process of solid preparations (such as tablets, capsules or granules).

Currently, in the prior art, there is neither a form of the compound of formula I that is suitable for preparation formation and has satisfactory stability, nor report on the crystal form of the compound of formula I. The inventors have obtained the crystal forms of the compound of formula I through a large number of experiments.

SUMMARY

Therefore, in view of the above-mentioned problems in the prior art, the present disclosure provides crystal forms of a compound of formula I (E)-3-(3,5-difluoro-4-((1R,3R)-2-((1-fluorocyclopropyl)methyl)-3-methyl-2,3,4,9-tetrahydro-1H-pyrido[3,4-b]indol-1-yl)phenyl)acrylic acid with the following structure, and preparation methods thereof.

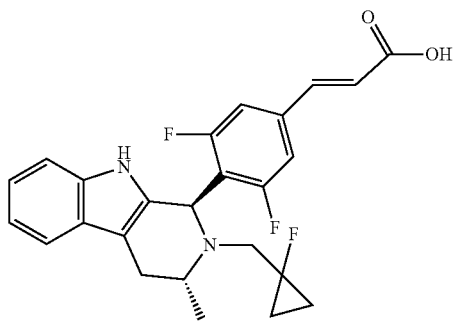

Formula I

In the first aspect, the present disclosure provides a crystal form A of the compound of formula I (hereinafter referred to as "crystal form A").

For the crystal form A, its X-ray powder diffraction (XRPD) pattern with Cu-Kα radiation shows characteristic peaks at 2θ of 10.5±0.2°, 12.3±0.2°, 14.9±0.2°, 16.2±0.2°, 18.1±0.2°, 19.4±0.2°, 20.3±0.2°, and 24.4±0.2° in degrees.

Preferably, for the crystal form A, its X-ray powder diffraction pattern with Cu-Kα radiation shows characteristic peaks at 2θ of 10.5±0.2°, 12.3±0.2°, 13.6±0.2°, 14.2±0.2°, 14.9±0.2°, 16.2±0.2°, 17.1±0.2°, 18.1±0.2°, 19.4±0.2°, 20.3±0.2°, 22.8±0.2°, and 24.4±0.2° in degrees.

More preferably, for the crystal form A, its X-ray powder diffraction pattern with Cu-Kα radiation shows characteristic peaks and relative intensities at 2θ of the following positions in degrees:

| 2θ | Peak intensity % |
|---|---|
| 10.5 ± 0.2° | 100.0 |
| 12.3 ± 0.2° | 18.8 |
| 13.6 ± 0.2° | 6.1 |
| 14.2 ± 0.2° | 8.9 |
| 14.9 ± 0.2° | 33.1 |
| 16.2 ± 0.2° | 13.7 |
| 17.1 ± 0.2° | 11.2 |
| 18.1 ± 0.2° | 26.7 |
| 19.4 ± 0.2° | 27.5 |
| 20.3 ± 0.2° | 24.1 |
| 22.8 ± 0.2° | 6.5 |
| 24.4 ± 0.2° | 15.6 |

More preferably, the X-ray powder diffraction pattern of the crystal form A is substantially as shown in FIG. 1.

Further, the differential scanning calorimetry (DSC) curve of the crystal form A has an endothermic peak at 110-150° C., and the DSC curve is substantially as shown in FIG. 2.

Further, the thermogravimetric analysis (TGA) curve of the crystal form A is substantially as shown in FIG. 3. The water content of the crystal form A measured by the Karl Fischer moisture analyzer is 3.9%, and the weight loss shown by the TGA curve is 3.9%, which are combined to indicate that the crystal form A is a monohydrate of the compound of formula I.

Further, the single crystal of the monohydrate of compound of formula I is an orthorhombic crystal system, $P2_12_12_1$ space group, a=7.33580(10) Å, b=14.3722(2) Å, c=41.3094(7) Å, α=β=γ=90°. The structural formula of the monohydrate of the compound of formula I is as follows:

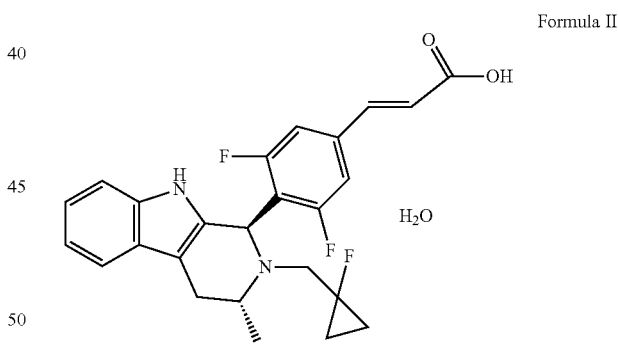

Formula II

Correspondingly, the present disclosure provides a method for preparing the crystal form A, selected from any one of the following methods:

(1) adding the compound of formula I to a solvent to obtain a suspension, wherein the solvent is C1-C3 alcohol, water or a mixture thereof, stirring crystal slurry in suspension at 5-50° C. for 1-7 days, separating solid, and drying it under vacuum at 20-60° C. for 8-24 h to obtain crystal form A;

preferably, the C1-C3 alcohol in the method (1) is one or more of methanol, ethanol, n-propanol, and isopropanol;

preferably, the weight-volume ratio of the compound of formula I to the solvent in the method (1) is 1:2-1:10 (g/mL);

(2) adding the compound of formula I to C1-C3 alcohol to obtain a clear solution after dissolution, then adding water to precipitate to turbidity, stirring until solidification, separating solid, and drying it under vacuum at 20-60° C. for 8-24 h to obtain crystal form A;

preferably, the C1-C3 alcohol in the method (2) is one or more of methanol, ethanol, n-propanol, and isopropanol;

preferably, the weight-volume ratio of the compound of formula I and the C1-C3 alcohol in the method (2) is 1:5-1:20 (g/mL);

preferably, the weight-volume ratio of the compound of formula I to water in the method (2) is 1:3-1:100 (g/mL).

In another aspect, the present disclosure provides a pharmaceutical composition comprising a therapeutically effective amount of the crystal form A as an active ingredient. Preferably, in the pharmaceutical composition, the crystal form A can be mixed with one or more pharmaceutically acceptable solid or liquid diluents and/or excipients to prepare into a galenic preparation.

In yet another aspect, the present disclosure provides use of the crystal form A or a pharmaceutical composition thereof in the manufacture of a medicament for the treatment of an estrogen receptor-mediated disease, wherein the disease is a cancer, the cancer is preferably breast cancer or gynecological cancer, the gynecological cancer is preferably ovarian cancer or endometrial cancer, and the estrogen receptor is preferably estrogen receptor α.

In yet another aspect, the present disclosure provides use of the crystal form A or a pharmaceutical composition thereof in the preparation of a selective estrogen receptor down-regulator, wherein the selective estrogen receptor down-regulator is preferably an estrogen receptor α down-regulator.

In addition, the present disclosure also provides a method for treating an estrogen receptor-mediated disease, comprising administering a therapeutically effective amount of the crystal form A to an individual in need thereof, wherein the disease is a cancer, the cancer is preferably breast cancer or gynecological cancer, the gynecological cancer is preferably ovarian cancer or endometrial cancer, and the estrogen receptor is preferably estrogen receptor α.

The present disclosure also provides a method for selectively down-regulating estrogen receptor, comprising contacting the crystal form A or a pharmaceutical composition thereof with an estrogen receptor, wherein the estrogen receptor is preferably estrogen receptor α.

In another aspect, the present disclosure provides a crystal form B of the compound of formula I (hereinafter referred to as "crystal form B").

For the crystal form B, its X-ray powder diffraction (XRPD) pattern with Cu-Kα radiation shows characteristic peaks at 2θ of 5.5±0.2°, 9.9±0.2°, 10.7±0.2°, 12.7±0.2°, 16.2±0.2°, 16.7±0.2°, and 23.0±0.2° in degrees.

Preferably, for the crystal form, its X-ray powder diffraction pattern with Cu-Kα radiation shows characteristic peaks at 2θ of 5.5±0.2°, 9.9±0.2°, 10.7±0.2°, 12.7±0.2°, 14.5±0.2°, 16.2±0.2°, 16.7±0.2°, 19.7±0.2°, 23.0±0.2°, 24.8±0.2° in degrees.

More preferably, for the crystal form B, its X-ray powder diffraction pattern with Cu-Kα radiation shows characteristic peaks and relative intensities at 2θ of the following positions in degrees:

| 2θ | Peak intensity % |
| --- | --- |
| 5.5 ± 0.2° | 21.1 |
| 9.9 ± 0.2° | 43.1 |
| 10.7 ± 0.2° | 100.0 |
| 12.7 ± 0.2° | 31.7 |
| 14.5 ± 0.2° | 28.2 |
| 16.2 ± 0.2° | 38.4 |
| 16.7 ± 0.2° | 81.5 |
| 19.7 ± 0.2° | 13.4 |
| 23.0 ± 0.2° | 63.6 |
| 24.8 ± 0.2° | 8.0 |

More preferably, the X-ray powder diffraction pattern of the crystal form B is substantially as shown in FIG. 4.

Further, the DSC curve of the crystal form B has an endothermic peak at 110-135° C., and the DSC curve is substantially as shown in FIG. 5.

Further, the TGA curve of the crystal form B is substantially as shown in FIG. 6. The water content of the crystal form B measured by the Karl Fischer moisture analyzer is 3.9%, and the weight loss shown by the TGA curve is 3.9%, which are combined to indicate that the crystal form B is a monohydrate of the compound of formula I.

Correspondingly, the present disclosure provides a method for preparing crystal form B, comprising:

adding the compound of formula I to a water-saturated halogenated hydrocarbon solution to form a suspension, stirring crystal slurry at 5-40° C. for 0.5-36 h, separating solid, and drying it under vacuum at 20-40° C. for 8-24 h to obtain crystal form B;

preferably, the halogenated hydrocarbon is one or more of dichloromethane, dichloroethane, trichloromethane, and dibromomethane;

preferably, the weight-volume ratio of the compound of formula I to the water-saturated halogenated hydrocarbon solution is 1:3-1:4 (g/mL).

In another aspect, the present disclosure provides a pharmaceutical composition comprising a therapeutically effective amount of the crystal form B as an active ingredient. Preferably, in the pharmaceutical composition, the crystal form B can be mixed with one or more pharmaceutically acceptable solid or liquid diluents and/or excipients to prepare into a galenic preparation.

In yet another aspect, the present disclosure provides use of the crystal form B or a pharmaceutical composition thereof in the manufacture of a medicament for the treatment of an estrogen receptor-mediated disease, wherein the disease is a cancer, the cancer is preferably breast cancer or gynecological cancer, the gynecological cancer is preferably ovarian cancer or endometrial cancer, and the estrogen receptor is preferably estrogen receptor α.

In yet another aspect, the present disclosure provides use of the crystal form B or a pharmaceutical composition thereof in the preparation of a selective estrogen receptor down-regulator, wherein the selective estrogen receptor down-regulator is preferably an estrogen receptor α down-regulator.

In addition, the present disclosure also provides a method for treating an estrogen receptor-mediated disease, comprising administering a therapeutically effective amount of the crystal form B to an individual in need thereof, wherein the disease is a cancer, the cancer is preferably breast cancer or gynecological cancer, the gynecological cancer is preferably ovarian cancer or endometrial cancer, and the estrogen receptor is preferably estrogen receptor α.

The present disclosure also provides a method for selectively down-regulating estrogen receptor, comprising contacting the crystal form B or a pharmaceutical composition thereof with an estrogen receptor, wherein the estrogen receptor is preferably estrogen receptor α.

In another aspect, the present disclosure provides a crystal form C of the compound of formula I (hereinafter referred to as "crystal form C").

For the crystal form C, its X-ray powder diffraction (XRPD) pattern with Cu-Kα radiation shows characteristic peaks at 2θ of 4.5±0.2°, 5.7±0.2°, 8.5±0.2°, 12.2±0.2°, 14.0±0.2°, 16.7±0.2°, 23.0±0.2° in degrees.

Preferably, for the crystal form C, its X-ray powder diffraction pattern with Cu-Kα radiation shows characteristic peaks and relative intensities at 2θ of the following positions in degrees:

| 2θ | Peak intensity % |
| --- | --- |
| 4.5 ± 0.2° | 28.9 |
| 5.7 ± 0.2° | 42.9 |
| 8.5 ± 0.2° | 100.0 |
| 12.2 ± 0.2° | 81.9 |
| 14.0 ± 0.2° | 49.8 |
| 16.7 ± 0.2° | 65.2 |
| 23.0 ± 0.2° | 27.9 |

More preferably, the X-ray powder diffraction pattern of the crystal form C is substantially as shown in FIG. 7.

Further, the DSC curve of the crystal form C has an endothermic peak at 100-140° C., and the DSC curve is substantially as shown in FIG. 8.

Further, the TGA curve of the crystal form C is substantially as shown in FIG. 9. The water content of the crystal form C measured by the Karl Fischer moisture analyzer is 3.9%, and the weight loss shown by the TGA curve is 3.9%, which are combined to indicate that the crystal form C is a monohydrate of the compound of formula I.

Correspondingly, the present disclosure provides a method for preparing the crystal form C, comprising:
  adding the compound of formula I to a water-saturated halogenated hydrocarbon solution to form a suspension, stirring crystal slurry at 5-40° C. for 2-7 days, separating solid, and drying it under vacuum at 20-40° C. for 8-24 h to obtain crystal form C;
  preferably, the halogenated hydrocarbon is one or more of dichloromethane, dichloroethane, trichloromethane, and dibromomethane;
  preferably, the weight-volume ratio of the compound of formula I to the water-saturated halogenated hydrocarbon solution is 1:15-1:50 (g/mL).

In another aspect, the present disclosure provides a pharmaceutical composition comprising a therapeutically effective amount of the crystal form C as an active ingredient. Preferably, in the pharmaceutical composition, the crystal form C can be mixed with one or more pharmaceutically acceptable solid or liquid diluents and/or excipients to prepare into a galenic preparation.

In yet another aspect, the present disclosure provides use of the crystal form C or a pharmaceutical composition thereof in the manufacture of a medicament for the treatment of an estrogen receptor-mediated disease, wherein the disease is a cancer, the cancer is preferably breast cancer or gynecological cancer, the gynecological cancer is preferably ovarian cancer or endometrial cancer, and the estrogen receptor is preferably estrogen receptor α.

In yet another aspect, the present disclosure provides use of the crystal form C or a pharmaceutical composition thereof in the preparation of a selective estrogen receptor down-regulator, wherein the selective estrogen receptor down-regulator is preferably an estrogen receptor α down-regulator.

In addition, the present disclosure also provides a method for treating an estrogen receptor-mediated disease, comprising administering a therapeutically effective amount of the crystal form C to an individual in need thereof, wherein the disease is a cancer, the cancer is preferably breast cancer or gynecological cancer, the gynecological cancer is preferably ovarian cancer or endometrial cancer, and the estrogen receptor is preferably estrogen receptor α.

The present disclosure also provides a method for selectively down-regulating estrogen receptor, comprising contacting the crystal form C or a pharmaceutical composition thereof with an estrogen receptor, wherein the estrogen receptor is preferably estrogen receptor α.

In another aspect, the present disclosure provides a crystal form D of the compound of formula I (hereinafter referred to as "crystal form D"). Its X-ray powder diffraction (XRPD) pattern with Cu-Kα radiation shows characteristic peaks at 2θ of 9.5±0.2°, 19.0±0.2°, 19.7±0.2°, 21.3±0.2°, and 21.8±0.2° in degrees.

In a specific embodiment, for the crystal form D of the present disclosure, its X-ray powder diffraction (XRPD) pattern with Cu-Kα radiation shows characteristic peaks at 2θ of 7.1±0.2°, 9.5±0.2°, 10.6±0.2°, 14.2±0.2°, 15.2±0.2°, 17.8±0.2°, 19.0±0.2°, 19.7±0.2°, 21.3±0.2°, and 21.8±0.2° in degrees.

In a more specific embodiment, for the crystal form D, its X-ray powder diffraction (XRPD) pattern with Cu-Kα radiation shows characteristic peaks at 7.1±0.2°, 9.5±0.2°, 10.6±0.2°, 11.8±0.2°, 12.7±0.2°, 14.2±0.2°, 15.2±0.2°, 17.8±0.2°, 19.0±0.2°, 19.7±0.2°, 20.7±0.2°, 21.3±0.2°, 21.8±0.2°, 23.8±0.2°, 24.2±0.2°, and 27.7±0.2° in degrees.

In one embodiment, the X-ray powder diffraction pattern of the crystal form D is substantially as shown in FIG. 10.

In another embodiment, the DSC curve of the crystal form D has an endothermic peak at 110-120° C., and the DSC curve is substantially as shown in FIG. 11.

In one embodiment, the crystal form D is a butanone solvate, and its single crystal data shows it is an orthorhombic crystal system, P2$_1$2$_1$2$_1$ space group, a=8.4557(4) Å, b=16.7248(9) Å, c=18.6864(10) Å, α=β=γ=90°.

The present disclosure relates to a method for preparing crystal form D, selected from any one of the following methods:
  method (1): adding the compound of formula I to butanone to form a clear solution, then adding water to precipitate to turbidity, stirring until solidification, separating solid, and drying it under vacuum at 20-40° C. for 8-24 h to obtain crystal form D;
  method (2), adding the compound of formula I to butanone to form a suspension, stirring at 20-40° C. for 1-3 days, separating solid, and drying it under vacuum at 20-40° C. for 8-24 h to obtain crystal form D.

In one aspect, the present disclosure relates to a crystal form E of the compound of formula I (hereinafter referred to as "crystal form E"). Its X-ray powder diffraction (XRPD) pattern with Cu-Kα radiation shows characteristic peaks at 2θ of 9.1±0.2°, 10.6±0.2°, 11.1±0.2°, 11.9±0.2°, 14.4±0.2°, 18.2±0.2°, 19.0±0.2°, 20.3±0.2°, and 21.8±0.2° in degrees.

In a specific embodiment, for the crystal form E, its X-ray powder diffraction (XRPD) pattern with Cu-Kα radiation shows characteristic peaks at 9.1±0.2°, 10.6±0.2°, 11.1±0.2°, 11.9±0.2°, 12.7±0.2°, 13.9±0.2°, 14.4±0.2°, 15.9±0.2°, 18.2±0.2°, 19.0±0.2°, 20.3±0.2°, 21.8±0.2°, 24.1±0.2°, 25.2±0.2°, and 25.8±0.2° in degrees.

In one embodiment, the X-ray powder diffraction pattern of the crystal form E is substantially as shown in FIG. 12.

In another embodiment, the DSC curve of the crystal form E has an endothermic peak at 110-130° C., and the DSC curve is substantially as shown in FIG. 13.

In one embodiment, the crystal form E is an acetone solvate.

In another aspect, the present disclosure relates to a method for preparing the crystal form E, selected from any one of the following methods:

method (1): adding the compound of formula I to acetone to form a clear solution, then adding water or n-heptane to precipitate to turbidity, stirring until solidification, separating solid, and drying it under vacuum at 20-40° C. for 8-24 h to obtain crystal form E;

method (2), adding the compound of formula I to acetone or a mixed solvent of acetone and n-heptane to form a suspension, stirring at 20-40° C. for 1-3 days, separating solid, and drying it under vacuum at 20-40° C. for 8-24 h to obtain crystal form E.

In one aspect, the present disclosure relates to a crystal form F of the compound of formula I (hereinafter referred to as "crystal form F"). Its X-ray powder diffraction (XRPD) pattern with Cu-Kα radiation shows characteristic peaks at 2θ of 4.4±0.2°, 8.8±0.2°, 13.5±0.2°, 14.9±0.2°, 15.6±0.2°, 16.6±0.2°, 17.9±0.2°, 22.8±0.2°, 30.1±0.2° in degrees.

In a specific embodiment, for the crystal form F, its X-ray powder diffraction (XRPD) pattern with Cu-Kα radiation shows characteristic peaks at 2θ of 4.4±0.2°, 8.8±0.2°, 11.6±0.2°, 13.5±0.2°, 14.9±0.2°, 15.6±0.2°, 16.6±0.2°, 17.9±0.2°, 18.6±0.2°, 19.7±0.2°, 21.1±0.2°, 22.0±0.2°, 22.8±0.2°, 23.9±0.2°, 24.4±0.2°, and 30.1±0.2° in degrees.

In one embodiment, the X-ray powder diffraction pattern of the crystal form F is substantially as shown in FIG. 14.

In another embodiment, the DSC curve of the crystal form F has an endothermic peak at 90-110° C., and the DSC curve is substantially as shown in FIG. 15.

In one embodiment, the crystal form F is a 1,4-dioxane solvate.

In another aspect, the present disclosure relates to a method for preparing the crystal form F, comprising: adding the compound of formula I to 1,4-dioxane to form a clear solution, then adding water to precipitate to turbidity, stirring until solidification, separating solid, and drying it under vacuum at 20-40° C. for 24 h to obtain crystal form F.

In one aspect, the present disclosure relates to a crystal form G of the compound of formula I (hereinafter referred to as "crystal form G"). Its X-ray powder diffraction (XRPD) pattern with Cu-Kα radiation shows characteristic peaks at 2θ of 4.3±0.2°, 5.9±0.2°, 8.8±0.2°, 12.6±0.2°, 14.4±0.2°, 17.7±0.2°, and 21.0±0.2° in degrees.

In one embodiment, the X-ray powder diffraction pattern of the crystal form G is substantially as shown in FIG. 16.

In another embodiment, the DSC curve of the crystal form G has an endothermic peak at 100-130° C., and the DSC curve is substantially as shown in FIG. 17.

In one embodiment, the crystal form G is methyl tert-butyl ether solvate.

In another aspect, the present disclosure relates to a method for preparing the crystal form Q comprising: adding the compound of formula I to methyl tert-butyl ether to form a suspension, stirring crystal slurry at 20-40° C. for 1-3 days, separating solid, and drying it under vacuum at 20-40° C. for 8 h to obtain crystal form G.

In one aspect, the present disclosure relates to a crystal form H of the compound of formula I (hereinafter referred to as "crystal form H"). Its X-ray powder diffraction (XRPD) pattern with Cu-Kα radiation shows characteristic peaks at 2θ of 4.7±0.2°, 5.6±0.2°, 9.1±0.2°, 10.1±0.2°, 12.2±0.2°, 13.4±0.2°, 14.4±0.2°, and 23.5±0.2° in degrees.

In one embodiment, the X-ray powder diffraction pattern of the crystal form H is substantially as shown in FIG. 18.

In another embodiment, the DSC curve of the crystal form H has an endothermic peak at 80-120° C., and the DSC curve is substantially as shown in FIG. 19.

In one embodiment, the crystal form H is an n-heptane solvate.

In another aspect, the present disclosure relates to a method for preparing the crystal form H, comprising: adding the compound of formula I to acetonitrile, tetrahydrofuran, ethanol, ether or a mixed solvent thereof, stirring to obtain a clear solution after dissolution, then adding n-heptane to precipitate to turbidity, stirring until solidification, separating solid, and drying it under vacuum at 20-40° C. for 8-24 h to obtain crystal form H.

DETAILED DESCRIPTION

Figure 1:
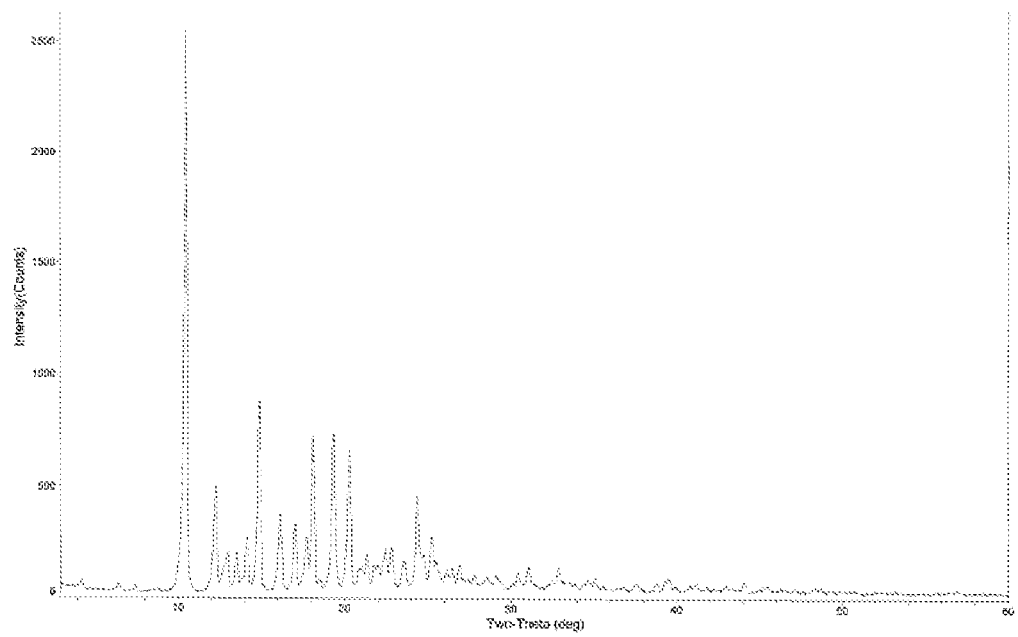
FIG. 1 is the X-ray powder diffraction pattern of the crystal form A prepared in Example 1.

The present disclosure will be described in further detail below. It should be understood that the expressions are intended to describe, not to limit the present disclosure.

General Definitions and Terms

Unless otherwise specified, the technical and scientific terms used herein have the same meanings as commonly understood by those skilled in the art to which the present disclosure belongs. In case of conflict, the definition provided in this application will prevail. When expressing a certain amount, concentration, or other value or parameter in the form of a range, a preferred range, or a preferred upper limit and a preferred lower limit, it should be understood that it is equivalent to specifically disclosing any range by combining any pair of upper limit of the range or preferred value with any lower limit of the range or preferred value, regardless of whether the range is specifically disclosed. Unless otherwise specified, the numerical ranges listed herein are intended to include the endpoints of the range and all integers and fractions (decimals) within the range.

The terms "about" and "approximately" when used with a numerical variable usually mean that the value of the variable and all the values of the variable are within experimental error (for example, within the 95% confidence interval of the mean) or within ±10% of the specified value, or within a wider range.

The expression "comprise" or the synonymous similar expressions "include", "contain" and "have" are open-ended, and do not exclude additional unlisted elements, steps or components. The expression "consist of" excludes any unspecified elements, steps or components. The expression" essentially consist of means that the scope is limited to the specified elements, steps or components, plus optional elements, steps or components that do not substantially affect the basic and new features of the claimed subject matter. It should be understood that the expression "comprise"/"comprising" encompasses the expressions "essentially consist of" and "consist of".

The term "optional" or "optionally" as used herein means that the event or situation subsequently described may or may not occur, and the expression includes the occurrence of the event or situation and the non-occurrence of the event or situation.

Unless otherwise specified, the percentages, parts, and the like used herein are all by weight.

As used herein, the term "crystal form" or "crystal" refers to any solid substance exhibiting a three-dimensional order, and producing a characteristic X-ray powder diffraction pattern with clearly-defined peaks as opposed to amorphous solid substances.

As used herein, the term "amorphous" refers to any solid substance that has no order in three dimensions.

As used herein, the term "hydrate" describes a solvate containing a drug and a stoichiometric or non-stoichiometric amount of water.

As used herein, the term "solvate" describes a solvate containing a drug and a stoichiometric or non-stoichiometric solvent other than water.

As used herein, the term "X-ray powder diffraction (XRPD) pattern" refers to an experimentally observed diffraction pattern or a parameter, data or value derived therefrom. The XRPD pattern is usually characterized by peak position (abscissa) and/or peak intensity (ordinate).

As used herein, the term "2θ" refers to the peak position expressed in degrees (°) based on the setting in the X-ray diffraction experiment, and is usually the unit of abscissa in the diffraction pattern. If when the incident beam forms an angle θ with a certain lattice plane, the reflection is diffracted, the experimental setup needs to record the reflected beam at an angle of 2θ. It should be understood that the specific 2θ value of the specific crystal form mentioned herein is intended to mean the 2θ value (in degrees) measured using the X-ray diffraction experimental conditions described herein. For example, as described herein, Cu-Kα (Kα1 is 1.5418 Å) is used as the radiation source. The XRPD pattern herein can be collected, for example, on Rigaku D/max-2200 X-ray powder diffraction analyzer. Exemplary test conditions may be a scanning speed of 10°/min and a scanning step width of 0.01°.

As used herein, the term "substantially" for X-ray diffraction peaks means to take into account variations in the position and intensity of the representative peaks. For example, those skilled in the art will understand that the peak position (2θ) will show some changes, usually as much as 0.1-0.2 degrees (±0.1 to ±0.2 degrees), and the instrument used to measure diffraction will also cause some changes. In addition, those skilled in the art will understand that the relative peak intensity will vary due to differences between instruments, and the degree of crystallinity, preferred orientation, prepared sample surface, and other factors known to those skilled in the art, and should be regarded as merely a qualitative measurement.

As used herein, differential scanning calorimetry (DSC) measures the transition temperature when a crystal absorbs or releases heat due to a change in its crystal structure or melting of the crystal. For the same crystal form of the same compound, in continuous analysis, the error of thermal transition temperature and melting point is typically within about 5° C. When a compound is described as having a given DSC peak or melting point, it means that the DSC peak or melting point is ±5° C. "Substantially" also takes these temperature change into account. DSC provides an auxiliary method to distinguish different crystal forms. Different crystal forms can be identified according to their different transition temperature characteristics. It should be pointed out that for a mixture, its DSC peak or melting point may vary in a larger range. In addition, due to the decomposition of the substance in the process of melting, the melting temperature is related to the heating rate. DSC curve can be measured, for example, on an instrument such as model NETZSCH DSC214 Polyma. Exemplary test conditions include heating rate of 10° C./min and temperature range of 25–250° C.

Pharmaceutical Composition and Administration

In one embodiment, the present disclosure provides a pharmaceutical composition which comprises a crystal form of the compound of formula I and one or more pharmaceutically acceptable carriers.

The term "pharmaceutically acceptable carrier" as used herein refers to a solid or liquid diluent, adjuvant, excipient or vehicle administered with the therapeutic agent, and it is suitable for contact with human and/or other animal tissues within the scope of reasonable medical judgment without excessive toxicity, irritation, allergic reaction, or other corresponding problems or complications compared with reasonable benefits/risks.

The pharmaceutically acceptable carriers that can be used in the pharmaceutical composition of the present disclosure include, but are not limited to, sterile liquids, such as water and oils, including those of petroleum, animal, vegetable, or synthetic origin, such as soybean oil, peanut oil, mineral oil, etc. When the pharmaceutical composition is administered intravenously, water is an exemplary carrier. It is also possible to use physiological saline and aqueous glucose and glycerol aqueous solutions as liquid carriers, especially for injections. Suitable pharmaceutical excipients include glucose, starch, lactose, gelatin, maltose, sucrose, chalk, silica gel, glyceryl monostearate, sodium stearate, talc, sodium chloride, glycerin, propylene glycol, water, ethanol and the like. The composition may also contain small amounts of wetting agents, emulsifiers or pH buffering agents as needed. Oral preparations may contain standard carriers such as pharmaceutical grades of mannitol, lactose, starch, magnesium stearate, cellulose, sodium saccharin, magnesium carbonate and the like. Examples of suitable pharmaceutically acceptable carriers are described in Remington's Pharmaceutical Sciences (1990).

The composition of the present disclosure can act systemically and/or locally. For this purpose, they can be administered through a suitable route, such as by injection, intraarterial, subcutaneous, intravenous, intraperitoneal, intramuscular or transdermal administration; or by oral, nasal, buccal, transmucosal, topical administration, or in the form of ophthalmic preparations or by inhalation.

For these administration routes, the composition of the present disclosure can be administered in a suitable dosage form. The dosage forms include, but are not limited to, tablets, pills, capsules, lozenges, hard lozenges, powders, sprays, creams, ointments, suppositories, gels, aqueous suspensions, injections, elixirs, and syrups.

The pharmaceutical composition of the present disclosure can be prepared by any method well known in the art, for example, by mixing, dissolving, granulating, sugar coating, milling, emulsifying, lyophilizing and the like. The term "therapeutically effective amount" as used herein refers to the amount of a compound that will relieve one or more symptoms of the condition being treated to a certain extent after being administered.

The dosage regimen can be adjusted to provide the best desired response. For example, a single bolus can be administered, several divided doses can be administered over time, or the dose can be proportionally reduced or increased as indicated by the urgent need for the treatment situation. It should be noted that the dose value may vary with the type and severity of the condition to be alleviated, and may include single or multiple doses. It should be further understood that for any particular individual, the specific dosing regimen should be adjusted over time according to the needs of the individual and the professional judgment of the person administering the composition or supervising the administration of the composition.

Unless otherwise specified, as used herein, the term "treating/treatment" means reversing, alleviating, or inhibiting the disorder or condition to which such terms are applied, or the progress of one or more symptoms of such disorder or condition, or preventing such disorder or condition or one or more symptoms of such disorder or condition.

"Individual" as used herein includes human or non-human animals. Exemplary human individuals include human individuals suffering from diseases such as those described herein (referred to as patients) or normal individuals. In the present disclosure, "non-human animals" include all vertebrates, such as non-mammals (e.g., amphibians, reptiles, birds) and mammals, such as non-human primates, livestock, and/or domesticated animals (e.g., dogs, cats, sheep, cows, pigs, etc.).

Beneficial Effect

The crystal form of the compound of formula I of the present disclosure has good solubility, simple crystallization process, convenient operation, low pollution, and can realize industrial production. Moreover, the crystal form medicine of the present disclosure has the advantages of high product purity, excellent physical and chemical properties, good chemical and physical stability to high temperature/high humidity, excellent processing (filtration, drying, dissolution and tableting) adaptability and reproducibility, and has good solubility, dissolution, dissolution time and biological release, which has a good market application prospect.

The present disclosure is further illustrated by way of the following examples, which are only described to better understand the content of the present disclosure, and do not constitute a restriction or limitation to the protection scope of the present disclosure.

Preparation and Characterization of the Crystal Form of the Compound of Formula I

PREPARATION EXAMPLE

Figure 20:
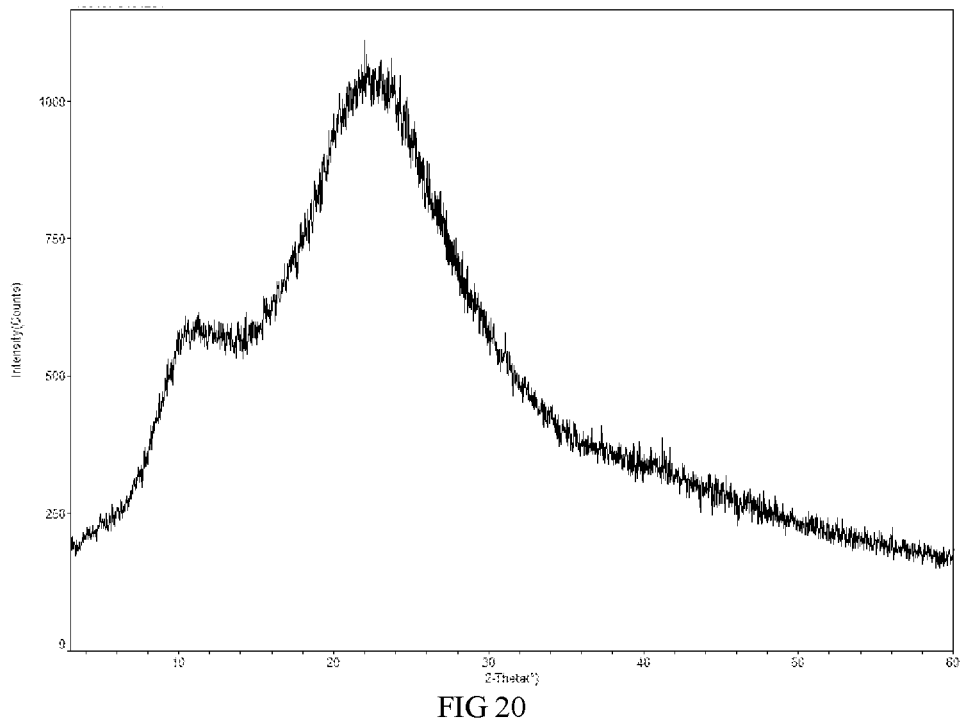
FIG. 20 is the X-ray powder diffraction pattern of the yellow amorphous solid obtained in Preparation example.

The compound of formula I described in the examples of the present disclosure is a yellow solid prepared according to method 1 in Example 1 of WO2017080338A1 comprising dissolving in dichloromethane/methanol mixed solvent and concentrating under reduced pressure. The obtained yellow solid is amorphous as determined by XRPD, and the X-ray powder diffraction pattern is shown in FIG. 20.

Information of Test Instrument and Test Methods

X-ray powder diffraction instrument and test conditions involved in the present disclosure: the model of the X-ray diffraction instrument was Rigaku D/max-2200 Cu target; the operation method included a scanning speed of 10°/min and scanning step width of 0.01°.

DSC test conditions involved in the present disclosure: the model of the DSC detector was NETZSCH DSC214 Polyma; the operation method included a heating rate of 10° C./min or 2° C./min and temperature range of 25-250° C.

TGA test conditions involved in the present disclosure: the model of the TGA detector was PerkinElmer TGA4000; the operation method included a heating rate of 10° C./min and temperature range of 25-250° C.

High-performance liquid chromatography (HPLC) test conditions involved in the present disclosure: the model of the liquid chromatograph was Agilent 1260; the chromatographic column was Agilent Eclipse XDB C-18 250 mm*4.6 mm 5um; the detection wavelength was 280 nm; and the column temperature was 35° C.

Single crystal test conditions involved in the present disclosure: the model of the single crystal X-ray diffractometer was Bruker APEX-II CCD, GaKα target, and the temperature was 169.97K.

Karl Fischer moisture analyzer involved in the present disclosure: the model was Mettler Toledo V20 Volumetric KF Tierator, and the solvent was methanol.

Figure 2:
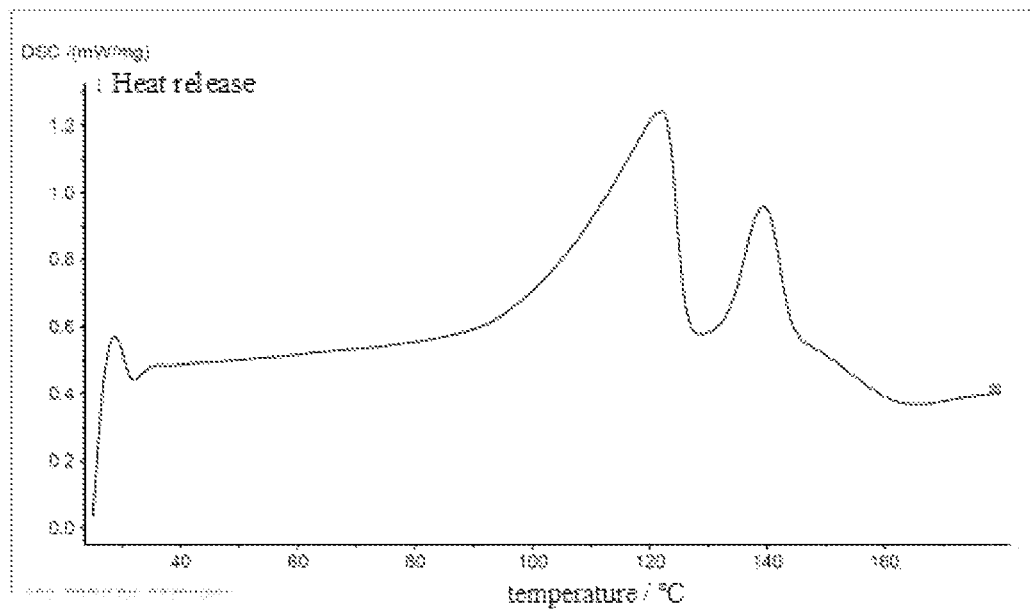
FIG. 2 is the DSC curve of the crystal form A prepared in Example 1.
Figure 3:
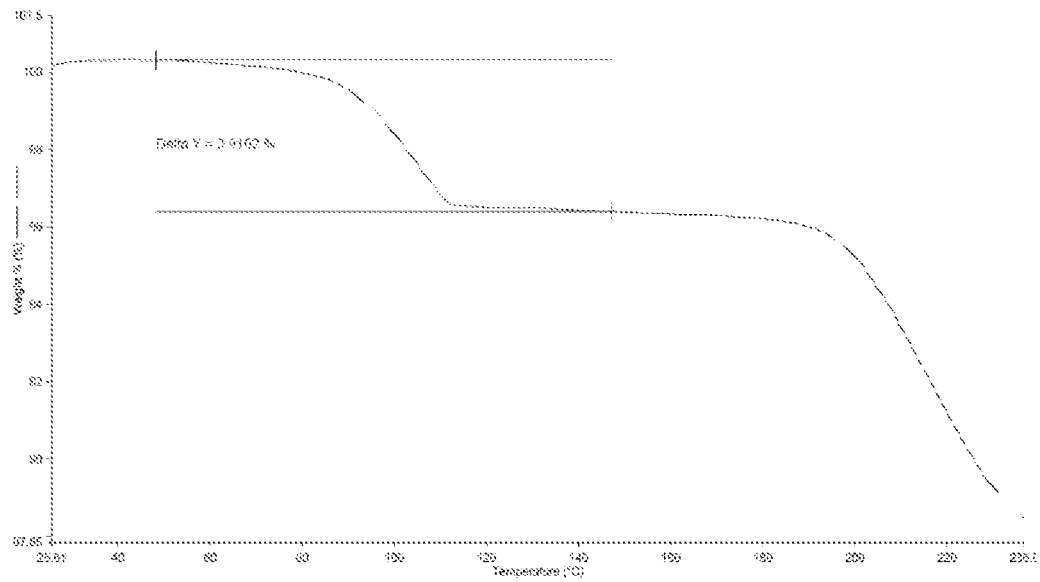
FIG. 3 is the TGA curve of the crystal form A prepared in Example 1.

Example 1 Preparation of Crystal Form A 1 g compound of formula I was added to 5 mL methanol and stirred at 25° C. to be dissolved. 3 mL water was added to precipitate to turbidity and stirred until solidification. The solid was separated and dried under vacuum at 40° C. for 8 h to obtain 0.85 g solid, which was crystal form A (purity 99.33%), and the X-ray powder diffraction pattern, DSC curve and TGA curve are shown in FIGS. 1-3, respectively.

Example 2 Preparation of Crystal Form A 1 g compound of formula I was added to 20 mL ethanol and stirred at 20° C. to be dissolved. 100 mL water was added to precipitate to turbidity and stirred until solidification. The solid was separated and dried under vacuum at 20° C. for 24 h to obtain 0.82 g solid, which was crystal form A, and the X-ray powder diffraction pattern, DSC curve and TGA curve are consistent with FIGS. 1-3, respectively.

Example 3 Preparation of Crystal Form A 1 g compound of formula I was added to 15 mL isopropanol and stirred at 60° C. to be dissolved. 50 mL water was added to precipitate to turbidity and stirred until solidification. The solid was separated and dried under vacuum at 60° C. for 16 h to obtain 0.87 g solid, which was crystal form A, and the X-ray powder diffraction pattern, DSC curve and TGA curve are consistent with FIGS. 1-3, respectively.

Example 4 Preparation of Crystal Form A 1 g compound of formula I was added to 10 mL water to obtain a suspension and the crystal slurry was stirred at 50° C. for a day. The solid was separated and the filter cake was dried under vacuum at 60° C. for 24 h to obtain 0.95 g solid, which was crystal form A, and the X-ray powder diffraction pattern, DSC curve and TGA curve are consistent with FIGS. 1-3, respectively.

Example 5 Preparation of Crystal Form A 1 g compound of formula I was added to 2 mL methanol to obtain a suspension and the crystal slurry was stirred at 5° C. for 7 days. The solid was separated and the filter cake was dried under vacuum at 20° C. for 8 h to obtain 0.90 g solid, which was crystal form A, and the X-ray powder diffraction pattern, DSC curve and TGA curve are consistent with FIGS. 1-3, respectively.

Example 6 Preparation of Crystal Form A 1 g compound of formula I was added to 4 mL isopropanol to obtain a suspension and the crystal slurry was stirred at 25° C. for 3 days. The solid was separated and the filter cake was dried under vacuum at 40° C. for 16 h to obtain 0.92 g solid, which was crystal form A, and the X-ray powder diffraction pattern, DSC curve and TGA curve are consistent with FIGS. 1-3, respectively.

Figure 4:
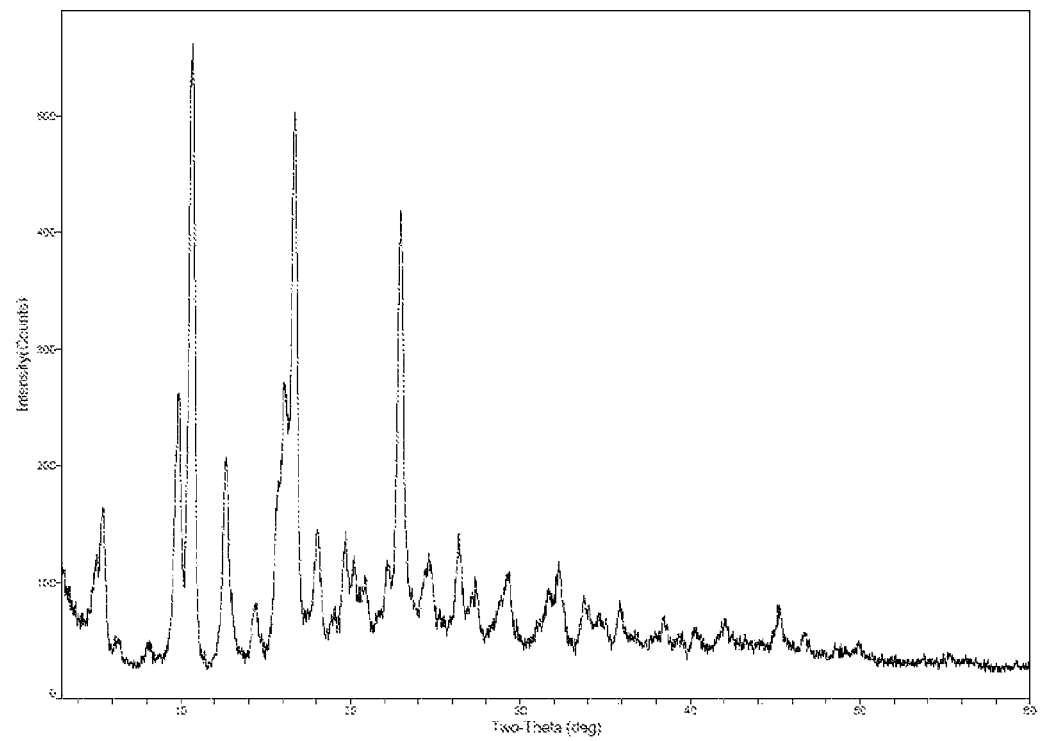
FIG. 4 is the X-ray powder diffraction pattern of the crystal form B prepared in Example 7.
Figure 5:
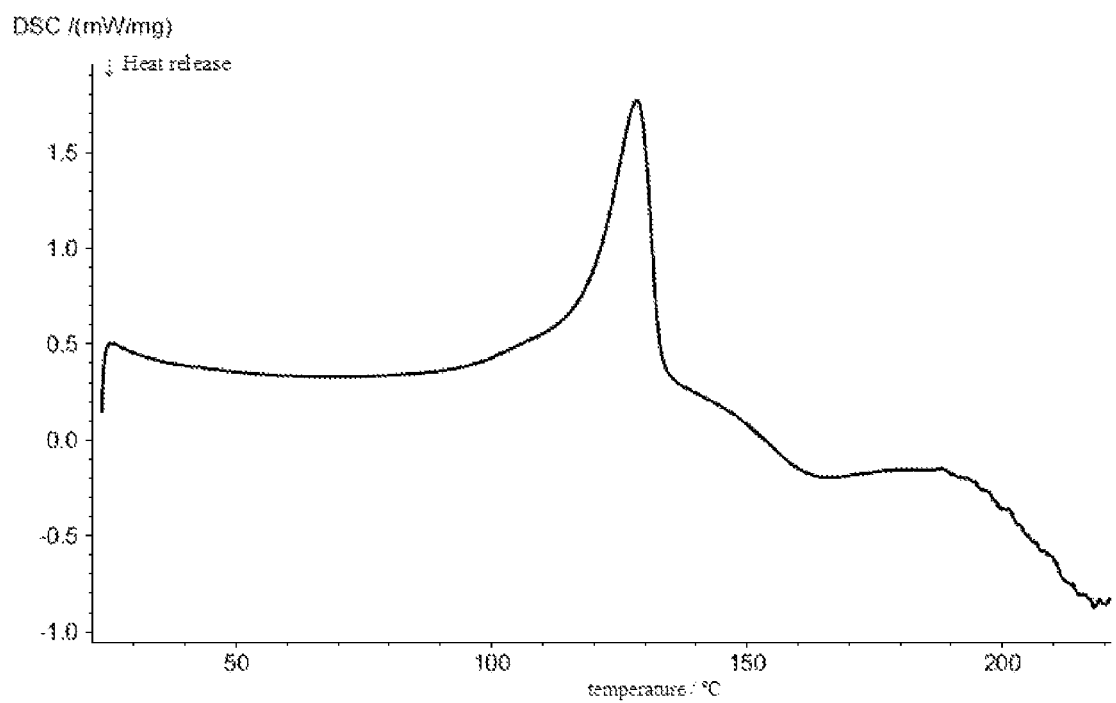
FIG. 5 is the DSC curve of the crystal form B prepared in Example 7.
Figure 6:
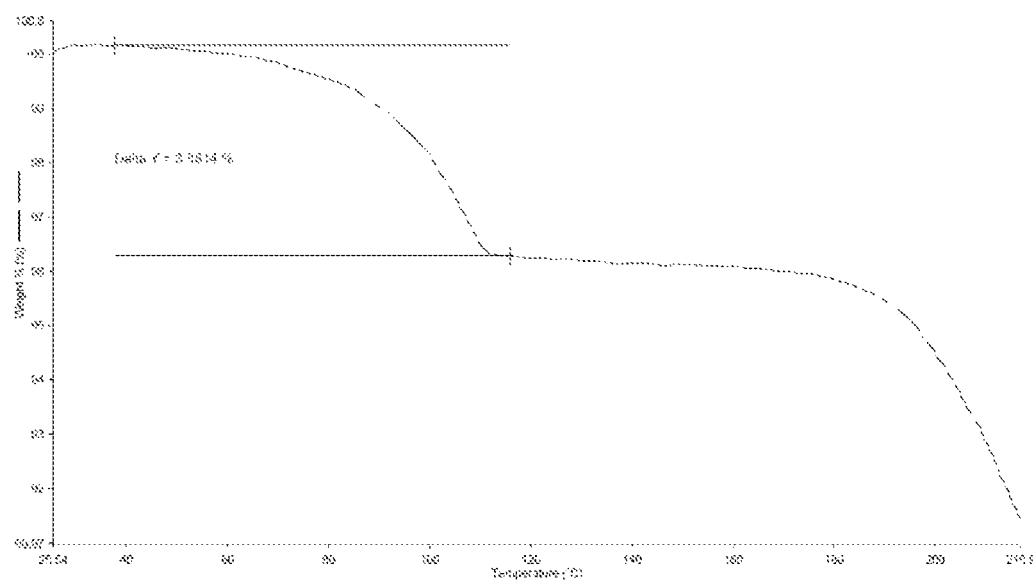
FIG. 6 is the TGA curve of the crystal form B prepared in Example 7.

Example 7 Preparation of Crystal Form B 1 g compound of formula I was added to 3 mL water-saturated dichloromethane to form a suspension and the crystal slurry was stirred at 25° C. for 24 h. The solid was separated and dried under vacuum at 40° C. for 8 h to obtain 0.65 g solid, which was crystal form B (purity 99.87%), and the X-ray powder diffraction pattern, DSC curve and TGA curve are shown in FIGS. 4-6, respectively.

Example 8 Preparation of Crystal Form B 1 g compound of formula I was added to 3 mL water-saturated dichloroethane to form a suspension, which was stirred at 40° C. for 0.5 h. The solid was separated and dried under vacuum at 20° C. for 8 h to obtain 0.78 g solid, which was crystal form B, and the X-ray powder diffraction pattern, DSC curve and TGA curve are consistent with FIGS. 4-6, respectively.

Example 9 Preparation of Crystal Form B 1 g compound of formula I was added to 4 mL water-saturated trichloromethane to form a suspension, which was stirred at 5° C. for 12 h. The solid was separated and dried under vacuum at 40° C. for 16 h to obtain 0.68 g solid, which was crystal form B, and the X-ray powder diffraction pattern, DSC curve and TGA curve are consistent with FIGS. 4-6, respectively.

Example 10 Preparation of Crystal Form B 1 g compound of formula I was added to 4 mL water-saturated dibromomethane to form a suspension, which was stirred at 15° C. for 36 h. The solid was separated and dried under vacuum at 40° C. for 24 h to obtain 0.72 g solid, which was crystal form B, and the X-ray powder diffraction pattern, DSC curve and TGA curve are consistent with FIGS. 4-6, respectively.

Figure 7:
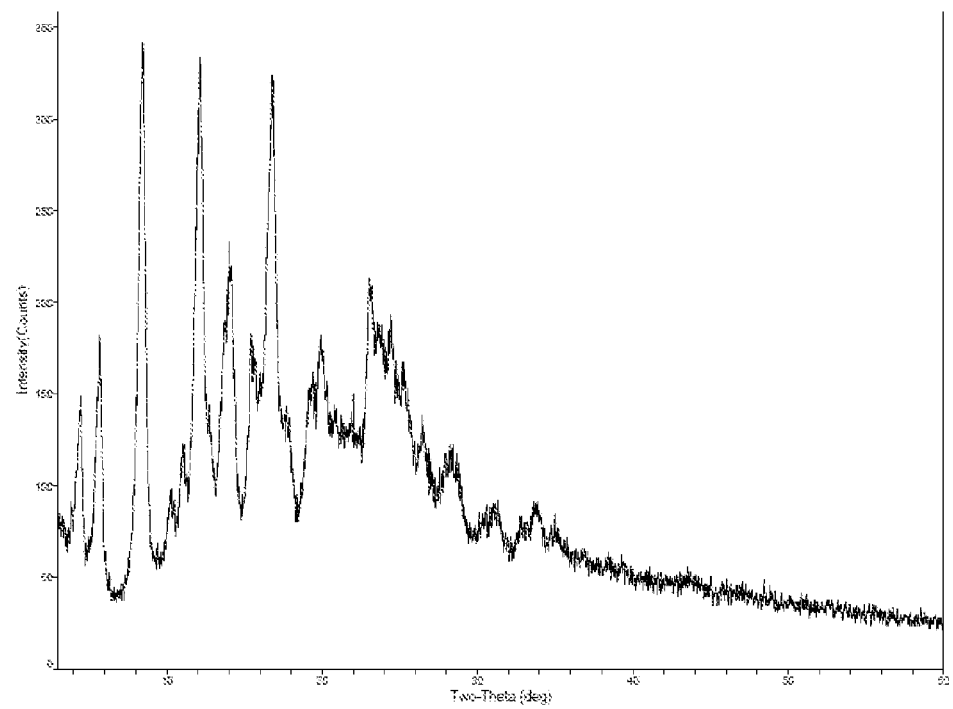
FIG. 7 is the X-ray powder diffraction pattern of the crystal form C prepared in Example 11.
Figure 8:
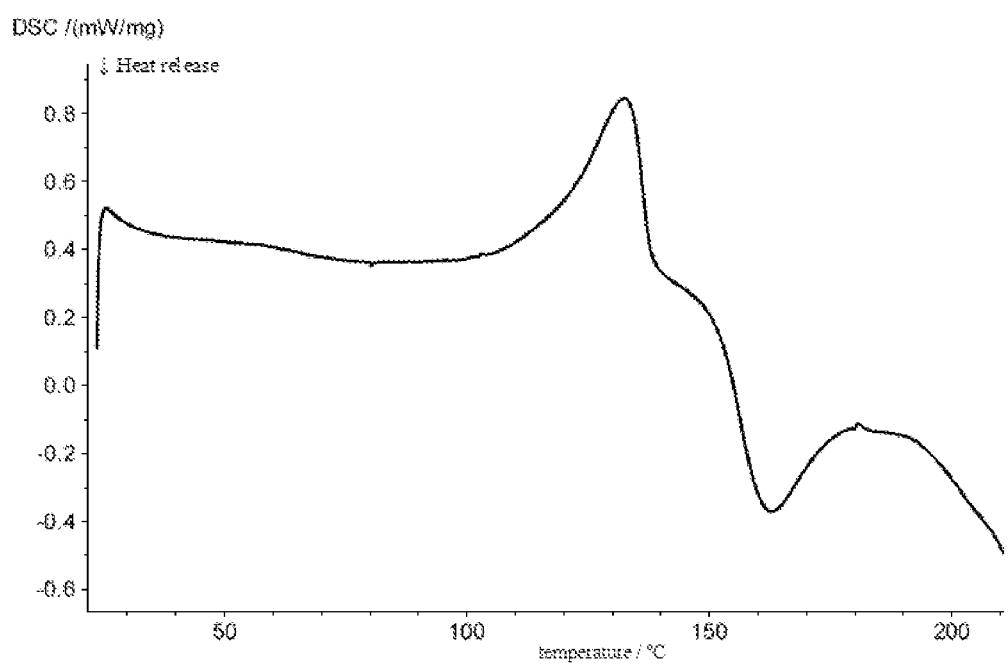
FIG. 8 is the DSC curve of the crystal form C prepared in Example 11.
Figure 9:
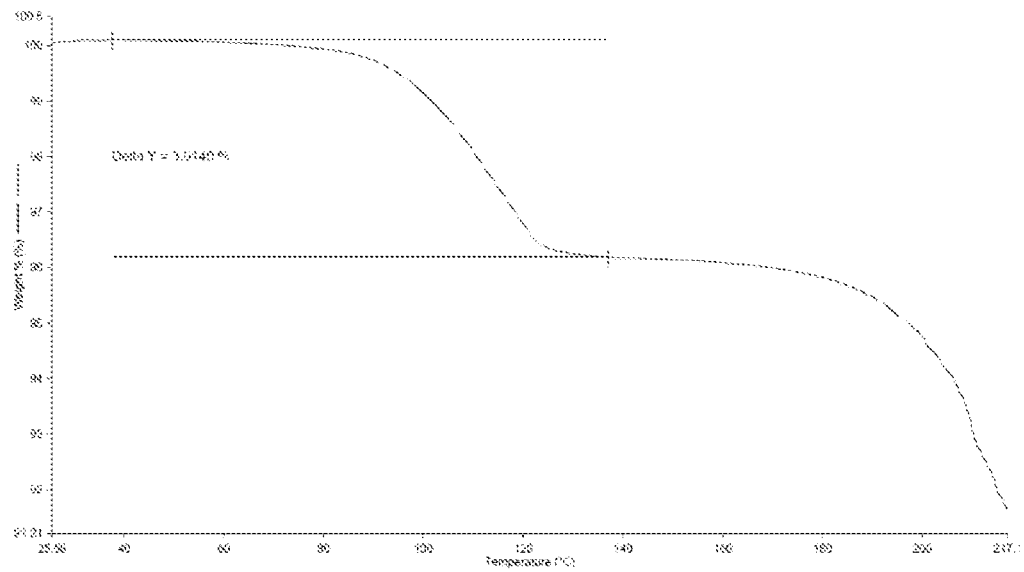
FIG. 9 is the TGA curve of the crystal form C prepared in Example 11.

Example 11 Preparation of Crystal Form C 1 g compound of formula I was added to 15 mL water-saturated dichloromethane to form a suspension, which was stirred at 25° C. for 3 days. The solid was separated and dried under vacuum at 40° C. for 8 h to obtain 0.80 g solid, which was crystal form C (purity 99.78%), and the X-ray powder diffraction pattern, DSC curve and TGA curve are shown in FIGS. 7-9, respectively.

Example 12 Preparation of Crystal Form C 1 g compound of formula I was added to 50 mL water-saturated dibromomethane to form a suspension, which was stirred at 5° C. for 7 days. The solid was separated and dried under vacuum at 40° C. for 16 h to obtain 0.68 g solid, which was crystal form C, and the X-ray powder diffraction pattern, DSC curve and TGA curve are consistent with FIGS. 7-9, respectively.

Example 13 Preparation of Crystal Form C 1 g compound of formula I was added to 25 mL water-saturated dichloroethane to form a suspension, which was stirred at 15° C. for 5 days. The solid was separated and dried under vacuum at 20° C. for 24 h to obtain 0.74 g solid, which was crystal form C, and the X-ray powder diffraction pattern, DSC curve and TGA curve are consistent with FIGS. 7-9, respectively.

Example 14 Preparation of Crystal Form C 1 g compound of formula I was added to 30 mL water-saturated trichloromethane to form a suspension, which was stirred at 40° C. for 3 days. The solid was separated and dried under vacuum at 30° C. for 16 h to obtain 0.71 g solid, which was crystal form C, and the X-ray powder diffraction pattern, DSC curve and TGA curve are consistent with FIGS. 7-9, respectively.

Figure 10:
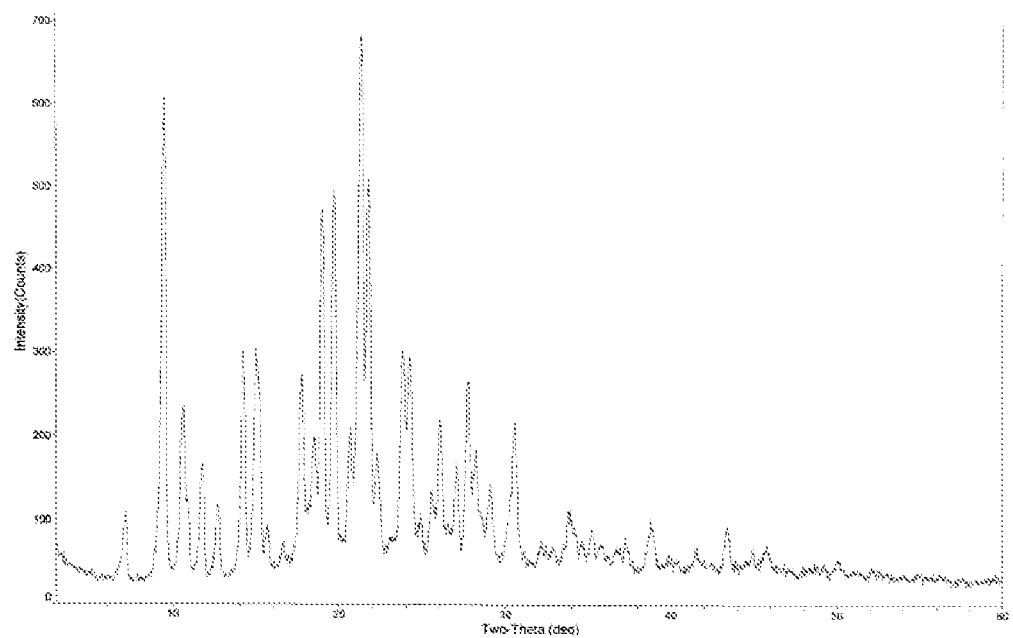
FIG. 10 is the X-ray powder diffraction pattern of the crystal form D prepared in Example 15.
Figure 11:
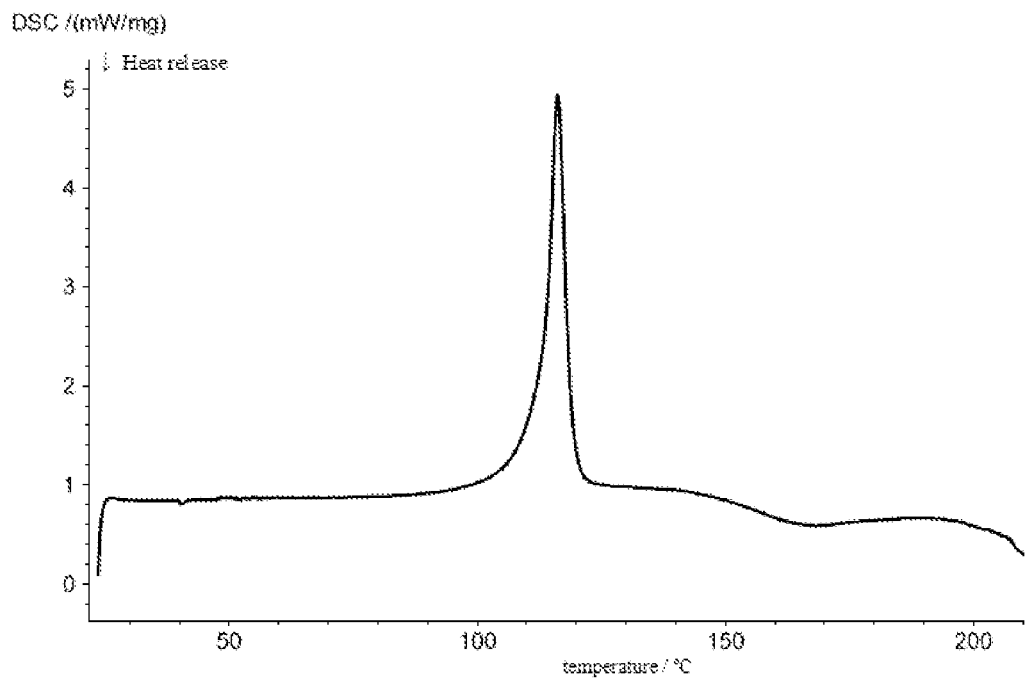
FIG. 11 is the DSC curve of the crystal form D prepared in Example 15.

Example 15 Preparation of Crystal Form D 1 g compound of formula I was added to 10 mL butanone and stirred to dissolve to form a clear solution. 100 mL water was added to precipitate to turbidity and stirred until solidification. The solid was separated and dried under vacuum at 40° C. for 8 h to obtain 0.81 g solid, which was crystal form D, and the X-ray powder diffraction pattern and DSC curve are shown in FIGS. 10-11, respectively.

Example 16 Preparation of Crystal Form D 1 g compound of formula I was added to 3 mL butanone to form a suspension, which was stirred at 25° C. for 24 h. The solid was separated and dried under vacuum at 40° C. for 24 h to obtain 0.91 g solid, which was crystal form D, and the X-ray powder diffraction pattern and DSC curve are consistent with FIGS. 10-11, respectively.

Figure 12:
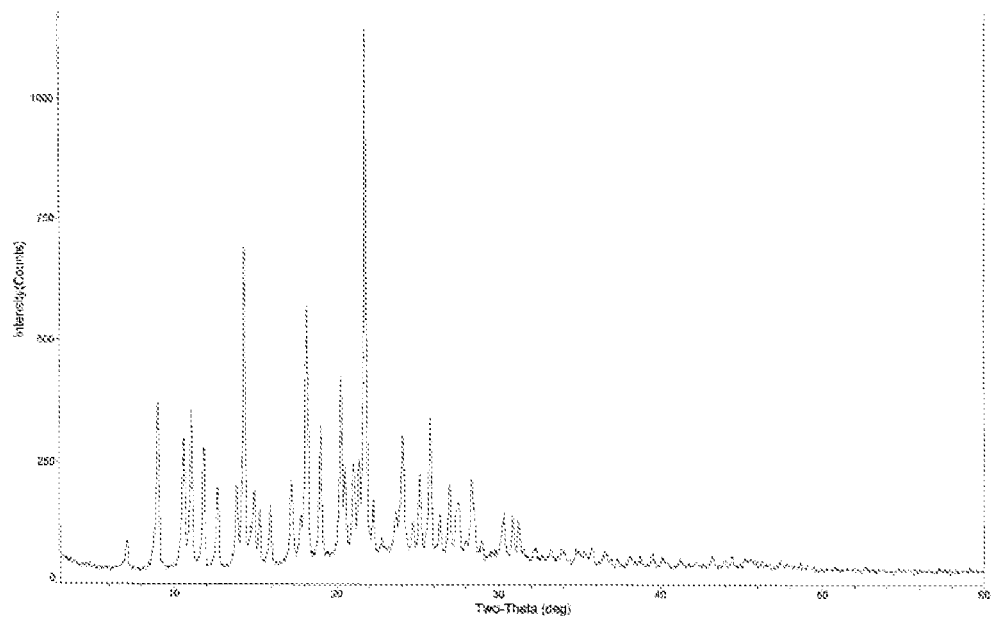
FIG. 12 is the X-ray powder diffraction pattern of the crystal form E prepared in Example 17.
Figure 13:
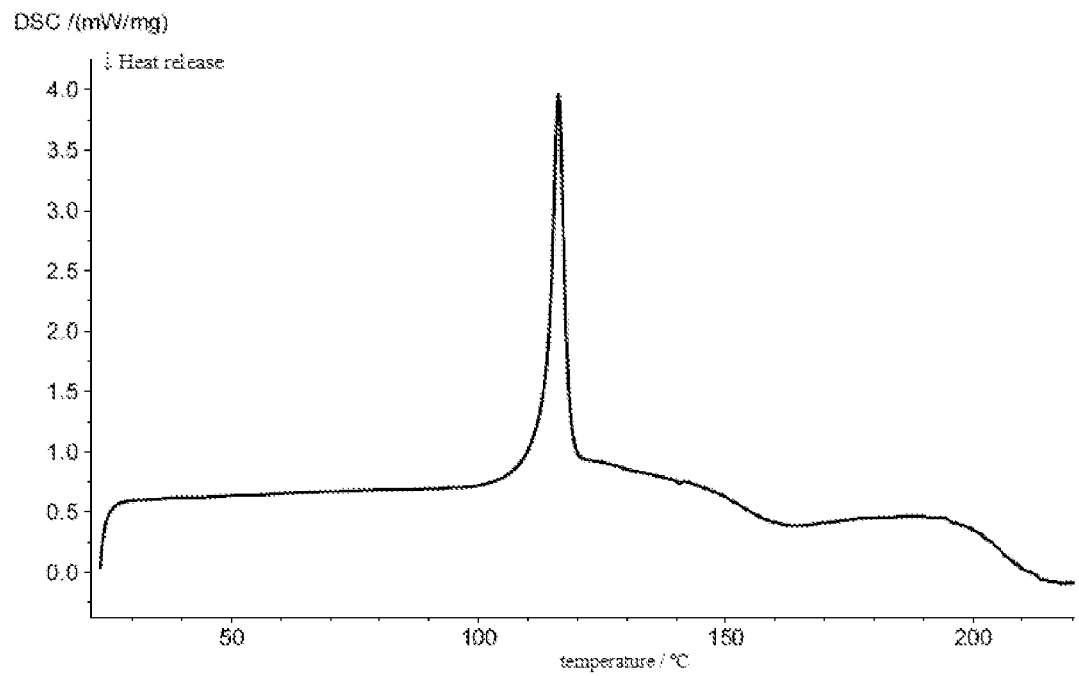
FIG. 13 is the DSC curve of the crystal form E prepared in Example 17.

Example 17 Preparation of Crystal Form E 1 g compound of formula I was added to 3 mL acetone to form a suspension, which was stirred at 25° C. for 24 h. Filtration was performed and the solid was separated and dried under vacuum at 40° C. for 8 h to obtain 0.55 g solid, which was crystal form E, and the X-ray powder diffraction pattern and DSC curve are shown in FIGS. 12-13, respectively.

Example 18 Preparation of Crystal Form E 1 g compound of formula I was added to 8 mL acetone and stirred to dissolve to form a clear solution. 6 mL n-heptane was added to precipitate to turbidity and stirred until solidification. The solid was separated and dried under vacuum at 40° C. for 24 h to obtain 0.75 g solid, which was crystal form E, and the X-ray powder diffraction pattern and DSC curve are consistent with FIGS. 12-13, respectively.

Example 19 Preparation of Crystal Form E 1 g compound of formula I was added to 8 mL acetone and stirred to dissolve to form a clear solution. 8 mL water was added to precipitate to turbidity and stirred until solidification. The solid was separated and dried under vacuum at 20° C. for 16 h to obtain 0.78 g solid, which was crystal form E, and the X-ray powder diffraction pattern and DSC curve are consistent with FIGS. 12-13, respectively.

Example 20 Preparation of Crystal Form E 1 g compound of formula I was added to 3 mL acetone and 3 mL n-heptane to form a suspension, which was stirred at 30° C. for 3 days. The filtration was performed and the solid was dried under vacuum at 25° C. for 16 h to obtain 0.82 g solid, which was crystal form E, and the X-ray powder diffraction pattern and DSC curve are shown in FIGS. 12-13, respectively.

Figure 14:
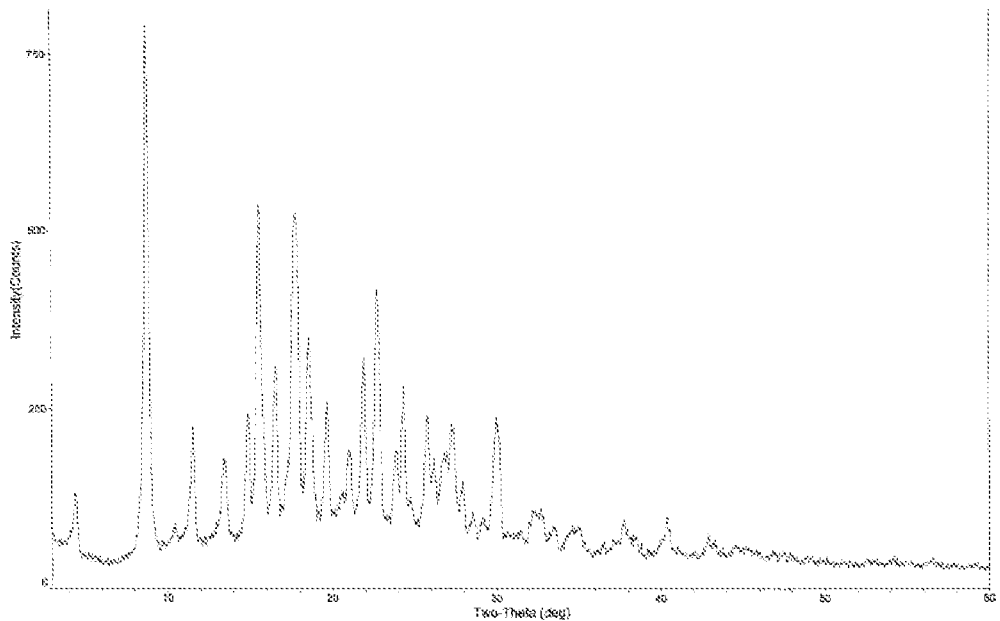
FIG. 14 is the X-ray powder diffraction pattern of the crystal form F prepared in Example 21.
Figure 15:
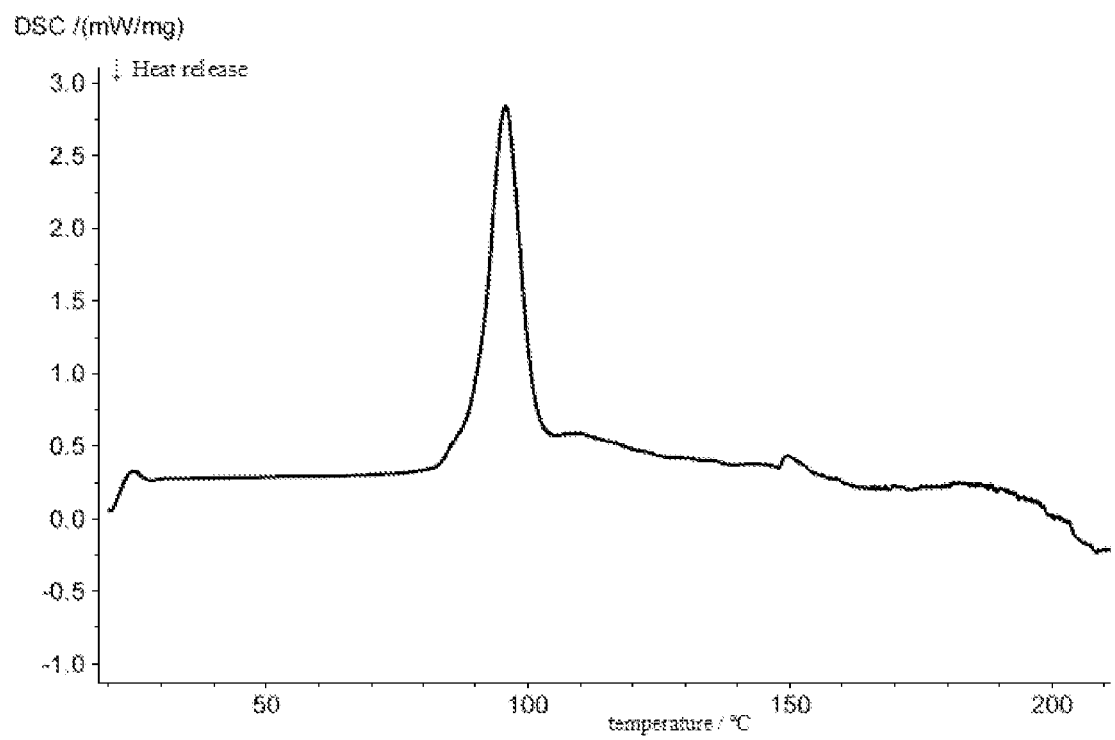
FIG. 15 is the DSC curve of the crystal form F prepared in Example 21.

Example 21 Preparation of Crystal Form F 1 g compound of formula I was added to 5 mL 1,4-dioxane and stirred to dissolve to form a clear solution. 200 mL water was added to precipitate a solid and stirred until solidification. The solid was separated and dried under vacuum at 40° C. for 24 h to obtain 0.94 g solid, which was crystal form F, and the X-ray powder diffraction pattern and DSC curve are shown in FIGS. 14-15, respectively.

Figure 16:
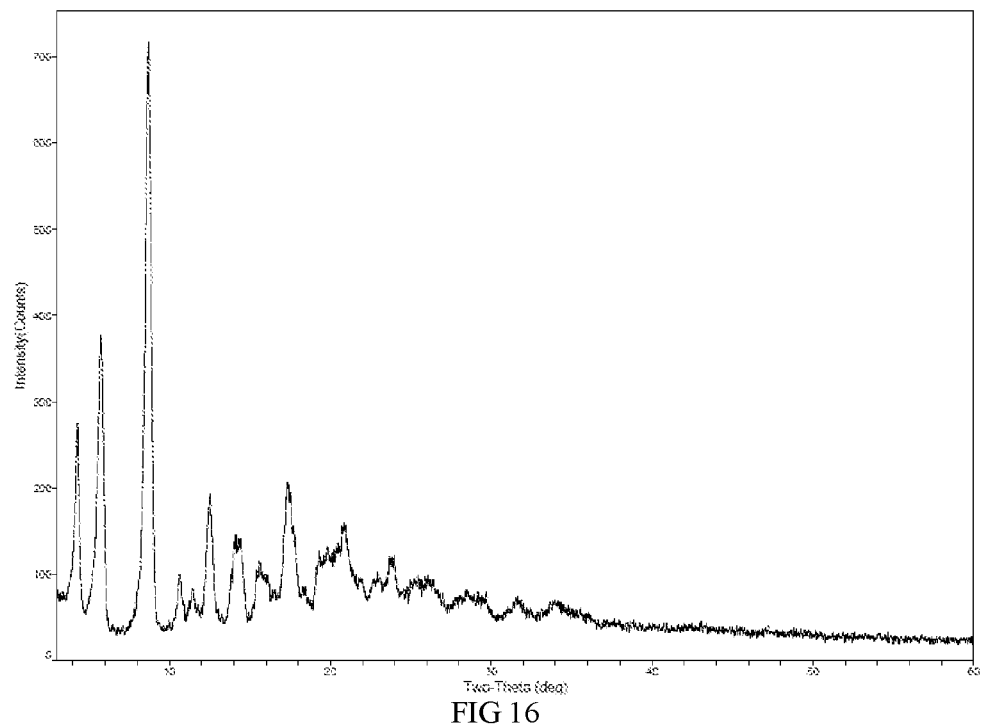
FIG. 16 is the X-ray powder diffraction pattern of the crystal form G prepared in Example 22.
Figure 17:
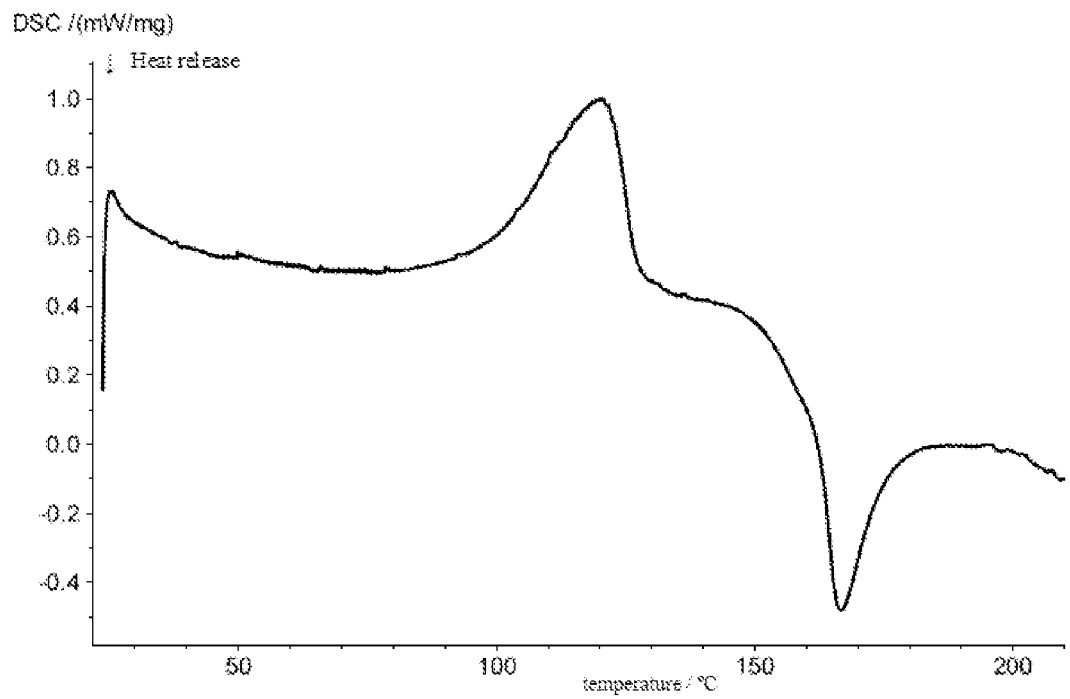
FIG. 17 is the DSC curve of the crystal form G prepared in Example 22.

Example 22 Preparation of Crystal Form G 1 g compound of formula I was added to 10 mL methyl tert-butyl ether to form a suspension, which was stirred at 25° C. for 24 h. The solid was separated and dried under vacuum at 40° C. for 8 h to obtain 0.75 g solid, which was crystal form G and the X-ray powder diffraction pattern and DSC curve are shown in FIGS. 16-17, respectively.

Figure 18:
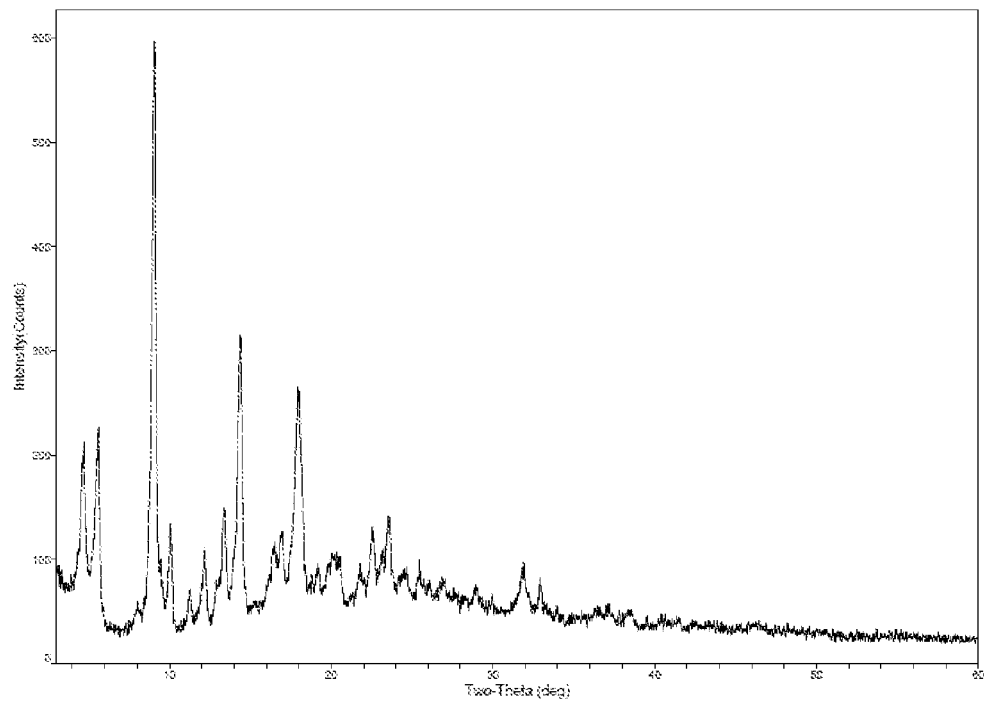
FIG. 18 is the X-ray powder diffraction pattern of the crystal form H prepared in Example 23.
Figure 19:
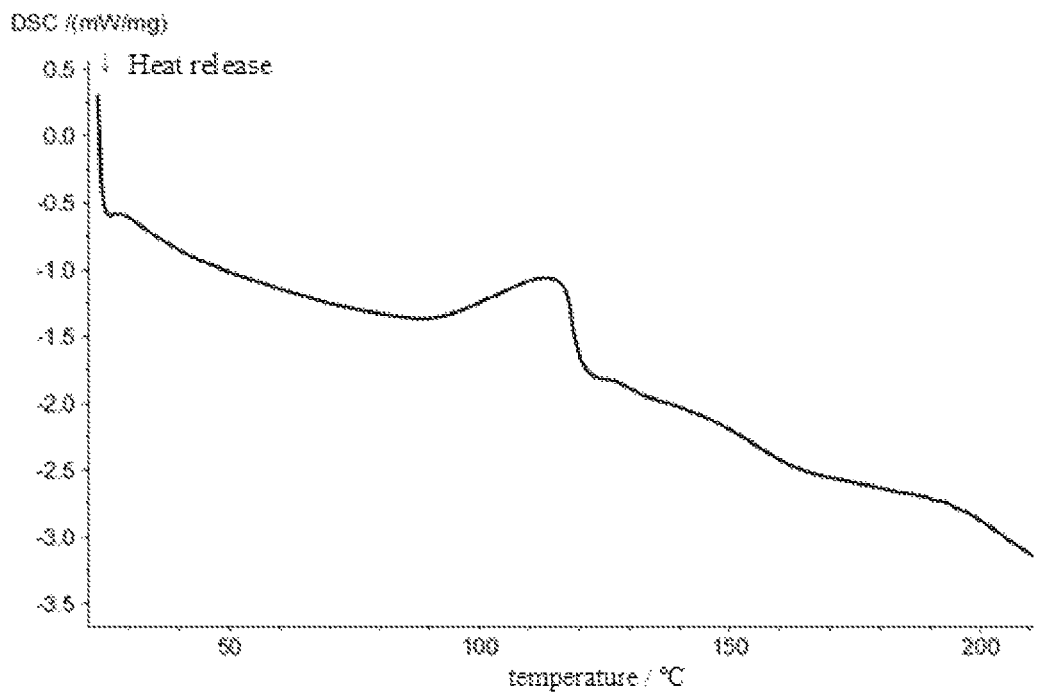
FIG. 19 is the DSC curve of the crystal form H prepared in Example 23.

Example 23 Preparation of Crystal Form H 1 g compound of formula I was added to 15 mL acetonitrile and stirred to dissolve to form a clear solution. 95 mL n-heptane was added to precipitate to turbidity and stirred until solidification. The solid was separated and dried under vacuum at 40° C. for 16 h to obtain 0.70 g solid, which was crystal form H, and the X-ray powder diffraction pattern and DSC curve are shown in FIGS. 18-19, respectively.

Example 24 Preparation of Crystal Form H 1 g compound of formula I was added to 10 mL ethanol and stirred to dissolve to form a clear solution. 100 mL n-heptane was added to precipitate to turbidity and stirred until solidification. The solid was separated and dried under vacuum at 20° C. for 8 h to obtain 0.74 g solid, which was crystal form H, and the X-ray powder diffraction pattern and DSC curve are consistent with FIGS. 18-19, respectively.

Example 25 Preparation of Crystal Form H 1 g compound of formula I was added to 150 mL ethyl ether and stirred to dissolve to form a clear solution. 950 mL n-heptane was added to precipitate to turbidity and stirred until solidification. The solid was separated and dried under vacuum at 40° C. for 8 h to obtain 0.67 g solid, which was crystal form H, and the X-ray powder diffraction pattern and DSC curve are consistent with FIGS. 18-19, respectively.

Example 26 Preparation of Crystal Form H 1 g compound of formula I was added to 10 mL tetrahydrofuran and stirred to dissolve to form a clear solution. 75 mL n-heptane was added to precipitate to turbidity and stirred until solidification. The solid was separated and dried under vacuum at 30° C. for 24 h to obtain 0.63 g solid, which was crystal form H, and the X-ray powder diffraction pattern and DSC curve are consistent with FIGS. 18-19, respectively.

Preparation of Amorphous Form of Compound of Formula I

The amorphous form of the compound of formula I was prepared according to Example 1 of WO2017080338A1.

Stability Experiment

The amorphous form of compound of formula I prepared in Preparation Example, the crystal form A of the compound of formula I prepared in Example 1, the crystal form B of the compound of formula I prepared in Example 7, and the crystal form C of the compound of formula I prepared in Example 11 were placed in 75% RH, 92.5% RH, 40° C., 60° C. and light for 10 days respectively, and the X-ray powder diffraction pattern and purity of each crystal form were measured. The results showed that the crystal form A, crystal form B and crystal form C had good stability, and the specific results are shown in the table below:

| | 0 day | | 75% RH 10 days | | 92.5% RH 10 days | | 40° C. 10 days | | 60° C. 10 days | | Light 10 days | |
|---|---|---|---|---|---|---|---|---|---|---|---|---|
| crystal form | Purity % | Purity % | crystal form | Purity % | crystal form | Purity % | crystal form | Purity % | crystal form | Purity % | crystal form |
| crystal form A | 99.33 | 99.31 | crystal form A | 99.34 | crystal form A | 99.27 | crystal form A | 99.22 | crystal form A | 99.27 | crystal form A |
| crystal form B | 99.87 | 99.81 | crystal form B | 99.81 | crystal form B | 99.77 | crystal form B | 99.75 | crystal form B | 99.68 | crystal form B |
| crystal form C | 99.78 | 99.79 | crystal form C | 99.78 | crystal form C | 99.80 | crystal form C | 99.84 | crystal form C | 99.71 | crystal form C |
| amorphous form | 95.82 | 96.22 | The sample became viscous and the XRD pattern changed. | 96.57 | The sample became viscous and the XRD pattern changed. | 95.80 | amorphous form | 95.67 | amorphous form | 95.55 | amorphous form |

Granularity Experiment

The amorphous form of compound of formula I prepared in Preparation Example, the crystal form A of the compound of formula I prepared in Example 1, the crystal form B of the compound of formula I prepared in Example 7, and the crystal form C of the compound of formula I prepared in Example 11 were measured for granularity, and the specific results are shown in the following table:

| amorphous form | | crystal form A | | crystal form B | | crystal form C | |
|---|---|---|---|---|---|---|---|
| D50 | 1190 | D50 | D90 | D50 | D90 | D50 | D90 |
| 3.02 μm | 23.01 μm | 16.37 μm | 61.86 μm | 15.48 μm | 60.79 μm | 15.02 μm | 59.88 μm |

The above results indicate that the particles of the amorphous form were apparently small, and the granularity was significantly smaller than that of the crystal forms A, B, and C.

Flowability Test

The amorphous form of compound of formula I prepared in Preparation Example, the crystal form A of the compound of formula I prepared in Example 1, the crystal form B of the compound of formula I prepared in Example 7, and the crystal form C of the compound of formula I prepared in Example 11 were measured for angle of repose, and the specific results are shown in the following table:

| amorphous form | | | crystal form A | | | crystal form B | | | crystal form C | | |
|---|---|---|---|---|---|---|---|---|---|---|---|
| 1 | 2 | 3 | 1 | 2 | 3 | 1 | 2 | 3 | 1 | 2 | 3 |
| 43.2° | 41.9° | 42.5° | 30.6° | 29.6° | 30.5° | 32.5° | 31.3° | 32.3° | 31.5° | 31.8° | 30.9° |

The above results indicate that the angle of repose of the amorphous form was significantly larger than that of the crystal forms A, B and C, indicating that the crystal forms A, B and C are significantly better than the amorphous form in terms of flowability.

Those skilled in the art can understand that the meaning or intended protection scope of the numerical value or numerical endpoint involved in the technical solution of the present disclosure is not limited to the number itself, and includes those allowable error ranges that have been widely accepted in the art, such as experimental error, measurement error, statistical error, random error, etc., and these error ranges are all included in the scope of the present disclosure.

It will be clear to those skilled in the art that many modifications and variations of the present disclosure can be made without departing from its spirit and scope. The specific embodiments described herein are provided by way of example only, and are not meant to be limited in any way. The true scope and spirit of the present disclosure are shown by the appended claims, and the description and examples are only exemplary.

The invention claimed is:

1. A crystal form A of a compound of formula I,

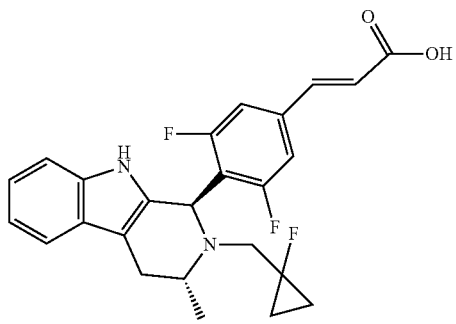

Formula I wherein its X-ray powder diffraction pattern with Cu-Kα radiation comprises characteristic peaks at 2θ of 10.5±0.2°, 12.3±0.2°, 14.9±0.2°, 16.2±0.2°, 18.1±0.2°, 19.4±0.2°, 20.3±0.2°, and 24.4±0.2° in degrees;
wherein the crystal form A is a monohydrate of the compound of formula I.

2. A method for preparing the crystal form A according to claim 1, selected from any one of the following methods:
method (1): adding the compound of formula I to a solvent to obtain a suspension, wherein the solvent is C1-C3 alcohol, water or a mixture thereof, stirring crystal slurry in the suspension at 5-50° C. for 1-7 days, separating solid, and drying it under vacuum at 20-60° C. for 8-24 hours to obtain crystal form A; or
method (2): adding the compound of formula I to a C1-C3 alcohol to obtain a clear solution after dissolution, then adding water to precipitate to turbidity, stirring until solidification, separating solid, and drying it under vacuum at 20-60° C. for 8-24 hours to obtain crystal form A.

3. The method for preparing the crystal form A according to claim 2, wherein in method (1), the C1-C3 alcohol in the method (1) is one or more of methanol, ethanol, n-propanol, and isopropanol.

4. The method for preparing the crystal form A according to claim 2, wherein in method (2), the C1-C3 alcohol in the method (2) is one or more of methanol, ethanol, n-propanol, and isopropanol.

5. The method for preparing the crystal form A according to claim 2, wherein weight-volume ratio of the compound of formula I to the solvent in the method (1) is 1:2-1:10 (g/mL).

6. The method for preparing the crystal form A according to claim 2, wherein weight-volume ratio of the compound of formula I and the C1-C3 alcohol in the method (2) is 1:5-1:20 (g/mL).

7. The method for preparing the crystal form A according to claim 2, wherein weight-volume ratio of the compound of formula I to water in the method (2) is 1:3-1:100 (g/mL).

8. A pharmaceutical composition, comprising a therapeutically effective amount of the crystal form A according to claim 1.

9. A method of treating a disease by downregulating estrogen receptor, comprising administering the crystal form A according to claim 1 to a subject in need thereof, wherein the disease is a cancer, the cancer is breast cancer.

10. The method of treating a disease by downregulating estrogen receptor according to claim 9, wherein the estrogen receptor is estrogen receptor α.

11. A method of downregulating estrogen receptor, comprising administering the crystal form A according to claim 1 to a subject in need thereof.

12. The method of downregulating estrogen receptor according to claim 11, wherein the method is for downregulating an estrogen receptor α.

13. A crystal form B of a compound of formula I,

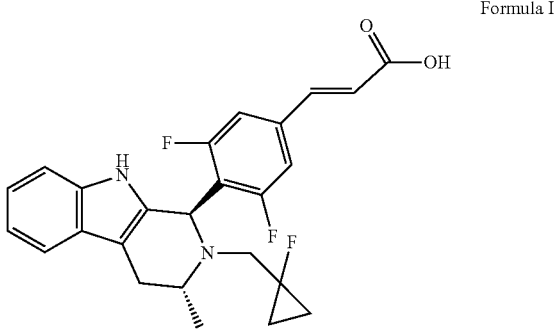 [SMILES: C[C@@H]1Cc2c([nH]c3ccccc23)[C@@H](c2c(F)cc(/C=C/C(=O)O)cc2F)N1CC1(F)CC1]

Formula I wherein its X-ray powder diffraction pattern with Cu-Kα radiation comprises characteristic peaks at 2θ of 5.5±0.2°, 9.9±0.2°, 10.7±0.2°, 12.7±0.2°, 16.2±0.2°, 16.7±0.2°, and 23.0±0.2° in degrees;
wherein the crystal form B is a monohydrate of the compound of formula I.

14. A method for preparing the crystal form B according to claim 13, comprising:
adding the compound of formula I to a water-saturated halogenated hydrocarbon solution to form a suspension, stirring crystal slurry at 5-40° C. for 0.5-36 hours, separating solid, and drying it under vacuum at 20-40° C. for 8-24 hours to obtain crystal form B.

15. The method for preparing the crystal form B according to claim 14, wherein the halogenated hydrocarbon is one or more of dichloromethane, dichloroethane, trichloromethane, and dibromomethane; or
weight-volume ratio of the compound of formula I to the water-saturated halogenated hydrocarbon solution is 1:3-1:4 (g/mL).

16. A crystal form C of a compound of formula I,

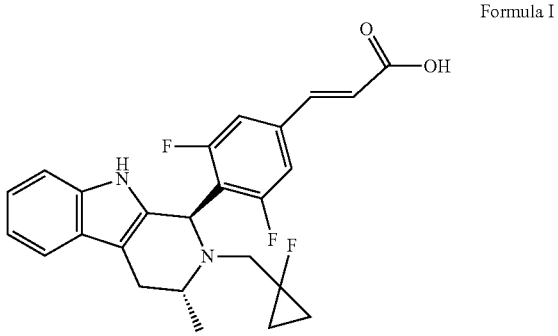 [SMILES: C[C@@H]1Cc2c([nH]c3ccccc23)[C@@H](c2c(F)cc(/C=C/C(=O)O)cc2F)N1CC1(F)CC1]

Formula I wherein its X-ray powder diffraction pattern with Cu-Kα radiation comprises characteristic peaks at 2θ of 4.5±0.2°, 5.7±0.2°, 8.5±0.2°, 12.2±0.2°, 14.0±0.2°, 16.7±0.2°, 23.0±0.2° in degrees;
wherein the crystal form C is a monohydrate of the compound of formula I.

17. A method for preparing the crystal form C according to claim 16, comprising:

adding the compound of formula I to a water-saturated halogenated hydrocarbon solution to form a suspension, stirring crystal slurry at 5-40° C. for 2-7 days, separating solid, and drying it under vacuum at 20-40° C. for 8-24 hours to obtain crystal form C.

18. The method for preparing the crystal form C according to claim 17, wherein the halogenated hydrocarbon is one or more of dichloromethane, dichloroethane, trichloromethane, and dibromomethane; or weight-volume ratio of the compound of formula I to the water-saturated halogenated hydrocarbon solution is 1:15-1:50 (g/mL).

* * * * *